United States Patent
Hikata et al.

(10) Patent No.: US 11,866,330 B2
(45) Date of Patent: Jan. 9, 2024

(54) METHOD FOR MANUFACTURING CARBON NANOTUBE, METHOD FOR MANUFACTURING CARBON NANOTUBE ASSEMBLED WIRE, METHOD FOR MANUFACTURING CARBON NANOTUBE ASSEMBLED WIRE BUNDLE, CARBON NANOTUBE MANUFACTURING APPARATUS, CARBON NANOTUBE ASSEMBLED WIRE MANUFACTURING APPARATUS, AND CARBON NANOTUBE ASSEMBLED WIRE BUNDLE MANUFACTURING APPARATUS

(71) Applicants: SUMITOMO ELECTRIC INDUSTRIES, LTD., Osaka (JP); UNIVERSITY OF TSUKUBA, Tsukuba (JP)

(72) Inventors: Takeshi Hikata, Osaka (JP); Toshihiko Fujimori, Osaka (JP); Soichiro Okubo, Osaka (JP); Jun Otsuka, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 80 days.

(21) Appl. No.: 17/433,019

(22) PCT Filed: Feb. 18, 2020

(86) PCT No.: PCT/JP2020/006205
§ 371 (c)(1),
(2) Date: Aug. 23, 2021

(87) PCT Pub. No.: WO2020/171047
PCT Pub. Date: Aug. 27, 2020

(65) Prior Publication Data
US 2022/0153585 A1 May 19, 2022

(30) Foreign Application Priority Data

Feb. 22, 2019 (JP) .................................. 2019-030644
Sep. 3, 2019 (JP) .................................. 2019-160766

(51) Int. Cl.
*C01B 32/162* (2017.01)

(52) U.S. Cl.
CPC ........ *C01B 32/162* (2017.08); *C01P 2004/61* (2013.01)

(58) Field of Classification Search
CPC ..... C01B 32/162; C01B 32/168; C01B 32/16; C01B 32/158; C01B 32/159;
(Continued)

(56) References Cited

U.S. PATENT DOCUMENTS

2005/0006801 A1* 1/2005 Kinloch ................. B82Y 40/00
435/182
2005/0170089 A1* 8/2005 Lashmore .............. B82Y 10/00
977/843
(Continued)

FOREIGN PATENT DOCUMENTS

CN 104117461 A 10/2014
EP 3579249 A1 12/2019
(Continued)

OTHER PUBLICATIONS

Vivekchand, et al., Carbon nanotubes by nebulized spray pyrolysis, Chemical Physics Letters 2004; 386: 313-318 (Year: 2004).*
(Continued)

*Primary Examiner* — Daniel C. McCracken
(74) *Attorney, Agent, or Firm* — Oliff PLC

(57) ABSTRACT

A method for manufacturing a carbon nanotube includes: a mist generating step of generating a mist including a catalyst particle and a liquid carbon source; and a growing step of
(Continued)

growing a carbon nanotube from the catalyst particle by heating the mist.

23 Claims, 10 Drawing Sheets

(58) Field of Classification Search
CPC ..... C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01P 2004/61; B01J 31/22; B01J 23/745; B82Y 40/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | |
|---|---|---|---|
| 2007/0224107 A1 | 9/2007 | Hikata | |
| 2008/0187648 A1* | 8/2008 | Hart | B01J 23/745 118/712 |
| 2011/0135835 A1 | 6/2011 | Son et al. | |
| 2013/0309473 A1* | 11/2013 | Sundaram | B01J 37/086 428/338 |
| 2017/0101317 A1 | 4/2017 | Malaibari et al. | |
| 2019/0039350 A1 | 2/2019 | Hu et al. | |

FOREIGN PATENT DOCUMENTS

| | | |
|---|---|---|
| JP | 2005-330175 A | 12/2005 |
| JP | 2008-201648 A | 9/2008 |
| JP | 2011-148689 A | 8/2011 |
| JP | 2011-208296 A | 10/2011 |
| JP | 5819888 B2 | 11/2015 |
| JP | 2018-505121 A | 2/2018 |
| KR | 10-2017-0065122 A | 6/2017 |
| WO | 2016/087857 A1 | 6/2016 |
| WO | 2016/208558 A1 | 12/2016 |
| WO | 2017/128944 A1 | 8/2017 |
| WO | 2018/0143466 A1 | 8/2018 |

OTHER PUBLICATIONS

Newman, et al., The Omron MicroAir vibrating mesh technology nebulizer, a 21st century approach to inhalation therapy, Journal of Applied Therapeutic Research 2005; 5(4): 29-33 (Year: 2005).*
Lekawa-Raus et al.; "Electrical Properties of Carbon Nanotube Based Fibers and Their Future Use in Electrical Wiring;" Advanced Functional Materials; 2014; pp. 3661-3682; vol. 24.
Jantharamatsakarn et al., "Ferrocene-ethanol-mist CVD grown SWCNT films as transparent electrodes," Procedia Engineering, vol. 93, pp. 49-58, 2014.

* cited by examiner

METHOD FOR MANUFACTURING CARBON NANOTUBE, METHOD FOR MANUFACTURING CARBON NANOTUBE ASSEMBLED WIRE, METHOD FOR MANUFACTURING CARBON NANOTUBE ASSEMBLED WIRE BUNDLE, CARBON NANOTUBE MANUFACTURING APPARATUS, CARBON NANOTUBE ASSEMBLED WIRE MANUFACTURING APPARATUS, AND CARBON NANOTUBE ASSEMBLED WIRE BUNDLE MANUFACTURING APPARATUS

TECHNICAL FIELD

The present disclosure relates to a method for manufacturing a carbon nanotube, a method for manufacturing a carbon nanotube assembled wire, a method for manufacturing a carbon nanotube assembled wire bundle, a carbon nanotube manufacturing apparatus, a carbon nanotube assembled wire manufacturing apparatus, and a carbon nanotube assembled wire bundle manufacturing apparatus. The present application claims priority based on Japanese Patent Application No. 2019-030644 filed on Feb. 22, 2019, and Japanese Patent Application No. 2019-160766 filed on Sep. 3, 2019. The entire contents described in the Japanese patent applications are incorporated herein by reference.

BACKGROUND ART

A carbon nanotube (hereinafter also referred to as CNT) composed of a cylindrical graphene sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, through vapor deposition by supplying a carbon-containing source gas while heating fine catalyst particles of iron or the like to grow the carbon nanotube from the catalyst particles, as described in PTL 1 (Japanese Patent Laid-Open No. 2005-330175).

CITATION LIST

Patent Literature

PTL 1: Japanese Patent Laid-open No. 2005-330175

Non Patent Literature

NPL 1: Agnieszka Lekawa-Raus et al., "Electrical Properties of Carbon Nanotube Based Fibers and Their Future Use in Electrical Wiring," Advanced Functional Materials, Vo. 24, p.p. 3661-3682 (2014). DOI:10.1002/adfm.201303716

SUMMARY OF INVENTION

A presently disclosed method for manufacturing a carbon nanotube comprises:
  a mist generating step of generating a mist including a catalyst particle and a liquid carbon source; and
  a growing step of growing a carbon nanotube from the catalyst particle by heating the mist.

A presently disclosed method for manufacturing a carbon nanotube assembled wire comprises:
  a mist generating step of generating a mist including a plurality of catalyst particles and a liquid carbon source;
  a growing step of growing one or more carbon nanotubes from each of the plurality of catalyst particles by heating the mist; and
  an assembling step of obtaining a carbon nanotube assembled wire by orienting and assembling the carbon nanotubes in their longitudinal direction.

A presently disclosed method for manufacturing a carbon nanotube assembled wire bundle comprises:
  a mist generating step of generating a mist including a plurality of catalyst particles and a liquid carbon source;
  a growing step of growing one or more carbon nanotubes from each of the plurality of catalyst particles by heating the mist;
  an assembling step of obtaining a plurality of carbon nanotube assembled wires by orienting and assembling the carbon nanotubes in their longitudinal direction; and
  a bundling step of obtaining a carbon nanotube assembled wire bundle by orienting and bundling the plurality of carbon nanotube assembled wires in their longitudinal direction.

A presently disclosed carbon nanotube manufacturing apparatus comprises:
  a mist generating unit that generates a mist including a catalyst particle and a liquid carbon source; and
  a tubular carbon nanotube growing unit that is connected to the mist generating unit and grows a carbon nanotube from the catalyst particle by heating the mist.

A presently disclosed carbon nanotube assembled wire manufacturing apparatus comprises:
  a mist generating unit that generates a mist including a plurality of catalyst particles and a liquid carbon source;
  a tubular carbon nanotube growing unit that is connected to the mist generating unit and grows one or more carbon nanotubes from each of the plurality of catalyst particles by heating the mist; and
  a carbon nanotube assembling unit that is located on a side of one end of the carbon nanotube growing unit, and obtains a carbon nanotube assembled wire by orienting and assembling the carbon nanotubes that are obtained in the carbon nanotube growing unit in their longitudinal direction.

A presently disclosed carbon nanotube assembled wire bundle manufacturing apparatus comprises:
  a carbon nanotube assembled wire manufacturing apparatus as described above; and
  a bundling unit that obtains a carbon nanotube assembled wire bundle by orienting and bundling a plurality of carbon nanotube assembled wires that are obtained by the carbon nanotube assembled wire manufacturing apparatus in their longitudinal direction.

DETAILED DESCRIPTION

Figure 1:
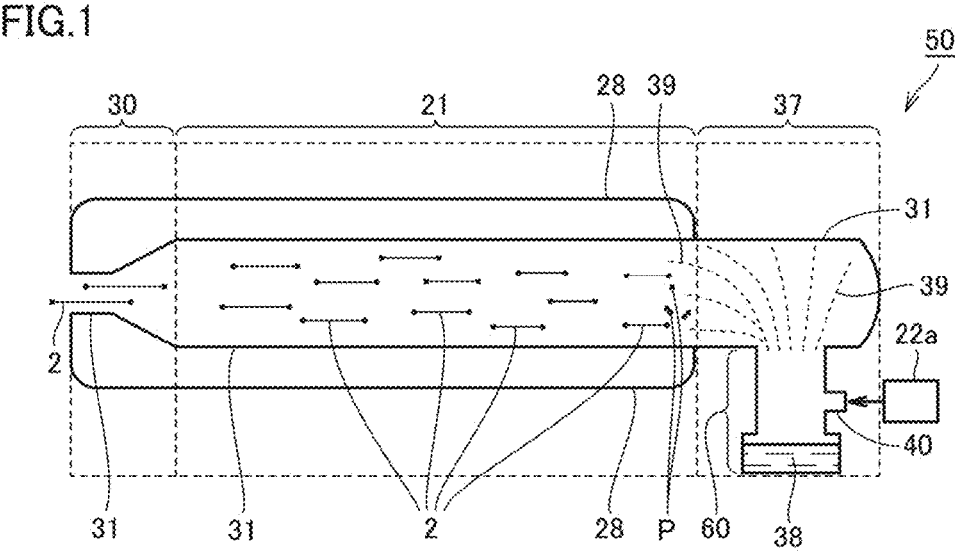
FIG. 1 is a diagram showing a representative configuration example of a carbon nanotube manufacturing apparatus in accordance with an embodiment of the present disclosure.

Problem to be Solved by the Present Disclosure

When carbon nanotubes are produced using catalyst particles, catalyst particles may be aggregated and coarsened. The coarsened catalyst particles may affect the CNT's inherent characteristics such as high tensile strength, resistance in terms of current density, chemical stability against corrosion or the like and weather resistance, and specific light absorption and emission ranging from near infrared to visible light. Therefore, there has been a demand for a technique to suppress coarsening of catalyst particles.

The present disclosure contemplates a method for manufacturing a CNT, a method for manufacturing a CNT assembled wire, a method for manufacturing a CNT assembled wire bundle, a CNT manufacturing apparatus, a CNT assembled wire manufacturing apparatus, and a CNT assembled wire bundle manufacturing apparatus, that can suppress coarsening of catalyst particles.

Advantageous Effect of the Present Disclosure

According to the above aspect, coarsening of catalyst particles can be suppressed.

Description of Embodiments of the Present Disclosure

First, embodiments of the present disclosure will be specified and described.

(1) A method for manufacturing a carbon nanotube in accordance with one aspect of the present disclosure comprises:
 a mist generating step of generating a mist including a catalyst particle and a liquid carbon source; and
 a growing step of growing a carbon nanotube from the catalyst particle by heating the mist.

According to the above aspect, coarsening of catalyst particles can be suppressed.

(2) The mist preferably has an average particle diameter of 0.1 μm or more and 50 μm or less.

According to this, CNTs which do not have a characteristic degraded as otherwise coarsened catalyst particles are introduced therein, can be provided successively.

(3) The catalyst particle preferably includes iron. Using iron as a catalyst particle is suitable from the viewpoint of mass production of CNTs.

(4) The mist generating step preferably includes
 a preparation step of preparing a mist source material liquid containing the catalyst particle and the liquid carbon source, and
 an atomization step of atomizing the mist source material liquid by applying ultrasonic vibration to the mist source material liquid.

Atomizing the mist source material liquid using ultrasonic vibration is suitable from the viewpoint of making the mist's particle diameter uniform.

(5) The mist generating step preferably includes
 a preparation step of preparing a mist source material liquid containing the catalyst particle and the liquid carbon source, and
 an atomization step of atomizing the mist source material liquid by passing the mist source material liquid through a mesh while applying ultrasonic vibration to the mist source material liquid.

Atomizing the mist source material liquid by passing the mist source material liquid through a mesh while applying ultrasonic vibration is suitable from the viewpoint of making the mist's particle diameter uniform.

(6) The mesh preferably has an opening having a diameter of 1 μm or more and 50 μm or less.

This allows the mist to have an average particle diameter of 0.1 μm or more and 50 μm or less.

(7) Further, it is preferable to further comprise a drawing step of drawing the carbon nanotube that is obtained in the growing step by applying a tensile force to the carbon nanotube. This can increase the CNT in length.

(8) A method for manufacturing a carbon nanotube assembled wire in accordance with one aspect of the present disclosure comprises:
 a mist generating step of generating a mist including a plurality of catalyst particles and a liquid carbon source;

a growing step of growing one or more carbon nanotubes from each of the plurality of catalyst particles by heating the mist; and an assembling step of obtaining a carbon nanotube assembled wire by orienting and assembling the carbon nanotubes in their longitudinal direction.

According to the above aspect, coarsening of catalyst particles can be suppressed.

(9) Further, it is preferable to further comprise a drawing step of drawing the carbon nanotubes that are obtained in the growing step by applying a tensile force to the carbon nanotubes. This can increase the CNT in length.

(10) Preferably, in the growing step, the carbon nanotubes pass through a first flow channel, in the assembling step, the carbon nanotubes pass through one or more second flow channels located downstream of the first flow channel, and the one or more second flow channels each have an area in cross section smaller than an area in cross section of the first flow channel.

Thus, a tensile force toward the downstream side can be applied to the carbon nanotubes.

(11) Preferably, an atmosphere downstream of the one or more second flow channels is lower in temperature than an atmosphere upstream of the one or more second flow channels. This helps CNTs to assemble together.

(12) Preferably, the atmosphere upstream of the one or more second flow channels has a temperature of 800° C. or more, and the atmosphere downstream of the one or more second flow channels has a temperature of 600° C. or less. This helps CNTs to assemble together.

(13) Preferably, an atmosphere inside the one or more second flow channels has temperature lower at a downstream side thereof than an upstream side thereof, and an atmosphere inside the one or more second flow channels at a downstream end thereof has a temperature of 600° C. or less. This helps CNTs to assemble together in the second flow channel.

(14) Preferably, in the one or more second flow channels at a downstream side thereof there is a first region having an atmosphere with a temperature of 600° C. or less, and the first region has a length of 1 cm or more in the longitudinal direction of the one or more second flow channels. This helps CNTs to assemble together in the second flow channel.

(15) Preferably, the one or more second flow channels each have an area in cross section of 0.01 mm$^2$ or more and 4 mm$^2$ or less. This helps to reduce the CNT in diameter.

(16) Preferably, a ratio S1/S2 is 100 or more and 1000000 or less, where S1 is an area in cross section of the first flow channel and S2 is an area in cross section of each of the second flow channels. This helps to draw the CNT and reduce the CNT in diameter.

(17) Preferably, in the assembling step, the carbon nanotubes are reduced in diameter. Thus, a CNT assembled wire including CNTs of a small diameter can be obtained.

(18) Preferably, the one or more second flow channels each have a length of 10 mm or more and 200 mm or less. This helps to draw the CNT and reduce the CNT in diameter.

(19) A method for manufacturing a carbon nanotube assembled wire bundle in accordance with one aspect of the present disclosure comprises:

a mist generating step of generating a mist including a plurality of catalyst particles and a liquid carbon source;

a growing step of growing one or more carbon nanotubes from each of the plurality of catalyst particles by heating the mist;

an assembling step of obtaining a plurality of carbon nanotube assembled wires by orienting and assembling the carbon nanotubes in their longitudinal direction; and a bundling step of obtaining a carbon nanotube assembled wire bundle by orienting and bundling the plurality of carbon nanotube assembled wires in their longitudinal direction.

According to the above aspect, coarsening of catalyst particles can be suppressed.

(20) Preferably, the bundling step includes: an adhering step of adhering a volatile liquid to the plurality of carbon nanotube assembled wires; and an evaporating step of evaporating the volatile liquid adhered to the plurality of carbon nanotube assembled wires. Thus, the obtained CNT assembled wire bundle has an increased density.

(21) Preferably, the adhering step is performed before orienting and bundling the plurality of carbon nanotube assembled wires in their longitudinal direction. Thus, in the process of evaporating the liquid penetrating in gaps between carbon nanotube filaments, the carbon nanotube filaments can be caused to approach one another and bonded together firmly.

(22) Preferably, the adhering step is performed after orienting and bundling the plurality of carbon nanotube assembled wires in their longitudinal direction. Thus, in the process of evaporating the liquid penetrating in gaps between carbon nanotube filaments, the carbon nanotube filaments can be caused to approach one another and bonded together firmly.

(23) Preferably, the bundling step is performed while tension is applied to the plurality of carbon nanotube assembled wires. Thus, the obtained CNT assembled wire bundle has an enhanced strength.

(24) A carbon nanotube manufacturing apparatus in accordance with one aspect of the present disclosure comprises:

a mist generating unit that generates a mist including a catalyst particle and a liquid carbon source; and a tubular carbon nanotube growing unit that is connected to the mist generating unit and grows a carbon nanotube from the catalyst particle by heating the mist.

According to the above aspect, coarsening of catalyst particles can be suppressed.

(25) Preferably, the mist generating unit includes a transducer, and the transducer generates the mist by applying ultrasonic vibration to a mist source material liquid including the catalyst particle and the liquid carbon source to atomize the mist source material liquid.

Atomizing the mist source material liquid using ultrasonic vibration is suitable from the viewpoint of making the mist's particle diameter uniform.

(26) Preferably, the mist generating unit includes a mesh disposed to face a vibrating surface of the transducer, and the transducer generates the mist by applying the ultrasonic vibration to the mist source material liquid as it is supplied between the vibrating surface and the mesh, and thus passing the mist source material liquid through the mesh to atomize the mist source material liquid.

Atomizing the mist source material liquid by passing the mist source material liquid through the mesh while applying ultrasonic vibration is suitable from the viewpoint of making the mist's particle diameter uniform.

(27) The mesh preferably has an opening having a diameter of 1 μm or more and 50 μm or less.

This allows the mist to have an average particle diameter of 0.1 μm or more and 50 μm or less.

(28) A carbon nanotube assembled wire manufacturing apparatus in accordance with one aspect of the present disclosure comprises:
- a mist generating unit that generates a mist including a plurality of catalyst particles and a liquid carbon source;
- a tubular carbon nanotube growing unit that is connected to the mist generating unit and grows one or more carbon nanotubes from each of the plurality of catalyst particles by heating the mist; and
- a carbon nanotube assembling unit that is located on a side of one end of the carbon nanotube growing unit, and obtains a carbon nanotube assembled wire by orienting and assembling the carbon nanotubes that are obtained in the carbon nanotube growing unit in their longitudinal direction.

According to the above aspect, coarsening of catalyst particles can be suppressed.

(29) Preferably, the carbon nanotube growing unit internally has a first flow channel,
- the carbon nanotube assembling unit internally has one or more second flow channels, and
- the one or more second flow channels each have an area in cross section smaller than an area in cross section of the first flow channel.

Thus, a tensile force toward the downstream side can be applied to carbon nanotubes.

(30) Preferably, the carbon nanotube assembling unit has a honeycomb structure. Thus, in the carbon nanotube assembling unit, a tensile force can be applied to CNTs and simultaneously, the carbon nanotubes can be caused to approach one other in an oriented state.

(31) Preferably, the honeycomb structure is a honeycomb structural body having a plurality of second flow channels formed by a plurality of through holes, and
- the second flow channels each have an area in cross section of 0.01 $mm^2$ or more and 4 $mm^2$ or less.

This helps to reduce the CNT in diameter.

(32) Preferably, a ratio S1/S2 is 100 or more and 1000000 or less, where S1 is an area in cross section of the first flow channel and S2 is an area in cross section of each of the second flow channels. This helps to draw the CNT and reduce the CNT in diameter.

(33) Preferably, in the carbon nanotube assembling unit, the carbon nanotubes are reduced in diameter. Thus, a CNT assembled wire including CNTs of a small diameter can be obtained.

(34) Preferably, the second flow channels of the carbon nanotube assembling unit each have a length of 10 mm or more and 200 mm or less. This helps to draw the CNT and reduce the CNT in diameter.

(35) A carbon nanotube assembled wire bundle manufacturing apparatus in accordance with one aspect of the present disclosure comprises:
- a carbon nanotube assembled wire manufacturing apparatus as described above; and
- a bundling unit that obtains a carbon nanotube assembled wire bundle by orienting and bundling a plurality of carbon nanotube assembled wires that are obtained by the carbon nanotube assembled wire manufacturing apparatus in their longitudinal direction.

According to the above aspect, coarsening of catalyst particles can be suppressed.

(36) Preferably, the bundling unit includes a liquid adhering apparatus that adheres a volatile liquid to the plurality of carbon nanotube assembled wires.

Thus, a CNT assembled wire bundle having a high density can be provided.

(37) Preferably, the bundling unit includes a winding apparatus that orients, bundles and winds the plurality of carbon nanotube assembled wires in a direction along their longitudinal direction while applying tension to the plurality of carbon nanotube assembled wires.

Thus, a CNT assembled wire bundle having a high density can be provided.

Details of Embodiments of the Present Invention

A specific example of a method for manufacturing a carbon nanotube, a method for manufacturing a carbon nanotube assembled wire, a method for manufacturing a carbon nanotube assembled wire bundle, a carbon nanotube manufacturing apparatus, a carbon nanotube assembled wire manufacturing apparatus, and a carbon nanotube assembled wire bundle manufacturing apparatus in accordance with one embodiment of the present disclosure will now be described hereinafter with reference to drawings.

In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

In the present specification, an expression in the form of "A to B" means a range's upper and lower limits (that is, A or more and B or less), and when A is not accompanied by any unit and B is alone accompanied by a unit, A has the same unit as B. Further, a range having an upper limit value of C means that the range has an upper limit which is C or less, and a range having a lower limit value of D means that the range has a lower limit which is D or more.

Embodiment 1: Method for Manufacturing Carbon Nanotube

A method for manufacturing a carbon nanotube in accordance with Embodiment 1 will now be described with reference to FIG. 1. The method for manufacturing a carbon nanotube comprises: a mist generating step of generating a mist including a catalyst particle and a liquid carbon source; and a growing step of growing a plurality of carbon nanotubes by growing a carbon nanotube from the catalyst particle by heating the mist.

The method for manufacturing a carbon nanotube can employ a carbon nanotube manufacturing apparatus 50 shown in FIG. 1 for example.

Carbon nanotube manufacturing apparatus 50 can include: a mist generating unit 37 that generates a mist 39 including a catalyst particle and a liquid carbon source; a gas supplying unit 22 that supplies carrier gas into mist generating unit 37; and a tubular carbon nanotube growing unit (hereinafter also referred to as a CNT growing unit) 21 connected to mist generating unit 37.

<Mist Generating Step>

In the mist generating step, mist 39 including catalyst particles and a liquid carbon source is generated. The mist generating step is performed using a mist generator 60.

The mist generating step can include: a preparation step of preparing a mist source material liquid containing catalyst particles and a liquid carbon source; and an atomization step of atomizing the mist source material liquid by applying ultrasonic vibration to the mist source material liquid.

A mist obtained by atomizing the mist source material liquid preferably has an average particle diameter of 0.1 μm or more and 50 μm or less, more preferably 1 μm or more and 40 μm or less, and still more preferably 10 μm or more and 30 μm or less. When the mist has an average particle diameter of less than 0.1 μm, it tends to suppress growth of a catalyst having a particle diameter suitable for growth of CNT. In contrast, when the mist has an average particle diameter exceeding 50 μm, it facilitates enlarging catalyst particles, and tends to decrease efficiency of growing CNTs.

In the present specification, the "average particle diameter" of the mist means a median diameter (d50) in volume-based particle size distribution (volume distribution), and means an average particle diameter of all mist particles included in the mist. It should be noted that, in the present specification, an "average particle diameter" may simply be referred to as a "particle diameter."

The particle diameter of each mist particle for calculating the particle diameter (volume average particle diameter) of the mist can be measured in the following method: Initially, a mist generator is used to generate a mist. The generated mist is irradiated with a laser beam using a dynamically light scattering, particle size distribution measuring instrument to detect a distribution in intensity of scattered light due to Brownian motion depending on the particle diameter to obtain a particle size distribution.

As the catalyst particles in the mist source material liquid, for example, particles including at least one type of metal element selected from the group consisting of iron, nickel, cobalt, molybdenum, gold, silver, copper, yttrium, chromium, palladium, platinum, and tungsten can be used. Herein, the catalyst particle including a metal element means both a case where the catalyst particle includes the metal element and another element (for example, oxygen, sulfur, etc.) together, and a case where the catalyst particle is composed of the metal element alone.

The catalyst particles in the mist source material liquid preferably include iron. In this case, the catalyst particles can be made of iron oxide ($Fe_2O_3$), ferrocene ($Fe(C_5H_5)_2$), or the like. Inter alia, the catalyst particles are more preferably made of iron oxide. Using iron oxide as the catalyst particles in the mist source material liquid is suitable from the viewpoint of mass production of CNTs. Therefore, when the catalyst particles in the mist source material liquid include iron oxide, elongate CNT assembled wires can be mass-produced.

The average particle diameter of the catalyst particles in the mist source material liquid is preferably 0.6 nm or more and less than 200 nm. According to this, the average particle diameter of the catalyst particles included in the CNT can be 0.6 nm or more and less than 30 nm. The average particle diameter of the catalyst particles in the mist source material liquid is more preferably 1 nm or more and 100 nm or less, and still more preferably 2 nm or more and 50 nm or less.

In the present specification, the "average particle diameter" of the catalyst particles in the mist source material liquid means a median diameter (d50) in volume-based particle size distribution (volume distribution), and means an average particle diameter of all catalyst particles included in the mist source material liquid. It should be noted that, in the present specification, an "average particle diameter" may simply be referred to as a "particle diameter."

As the liquid carbon source, ethanol, methanol, isopropyl alcohol, benzene, toluene, or xylene can be used. Inter alia, ethanol is suitable as it is a generally used reagent and is extremely harmless to the human body, and furthermore, it contains oxygen and can thus suppress formation of amorphous carbon.

The mist source material liquid may contain carbon disulfide, thiophene, and the like in addition to the catalyst particles and the liquid carbon source. Carbon disulfide, thiophene, and the like function as an assistive catalyst.

The content of the catalyst particles in the mist source material liquid is preferably 0.01% by mass or more and 5% by mass or less, more preferably 0.1% by mass or more and 4% by mass or less, and still more preferably 0.5% by mass or more and 2% by mass or less. If the content of the catalyst particles in the mist source material liquid is less than 0.01% by mass, efficiency of manufacturing CNTs tends to decrease. On the other hand, when the content of the catalyst particles in the mist source material liquid exceeds 5% by mass, the catalyst particles tend to be coarsened.

The content of the liquid carbon source in the mist source material liquid is preferably 95% by mass or more and 99.99% by mass or less, more preferably 96% by mass or more and 99.9% by mass or less, and still more preferably 98% by mass or more and 99.5% by mass or less. If the content of the liquid carbon source in the mist source material liquid is less than 95% by mass, efficiency of manufacturing CNTs tends to decrease. On the other hand, when the content of the liquid carbon source in the mist source material liquid exceeds 99.99% by mass, the carbon source is high in concentration with respect to an amount of catalyst added, and amorphous carbon tends to be produced in an increased amount.

Figure 2:
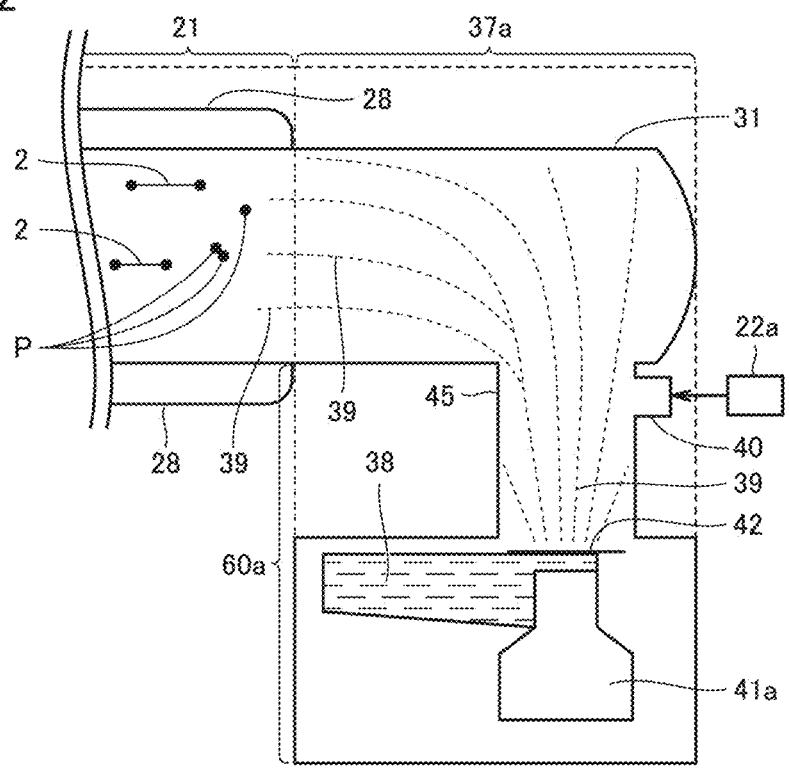
FIG. 2 is a diagram showing an example of a mist generating unit.
Figure 3:
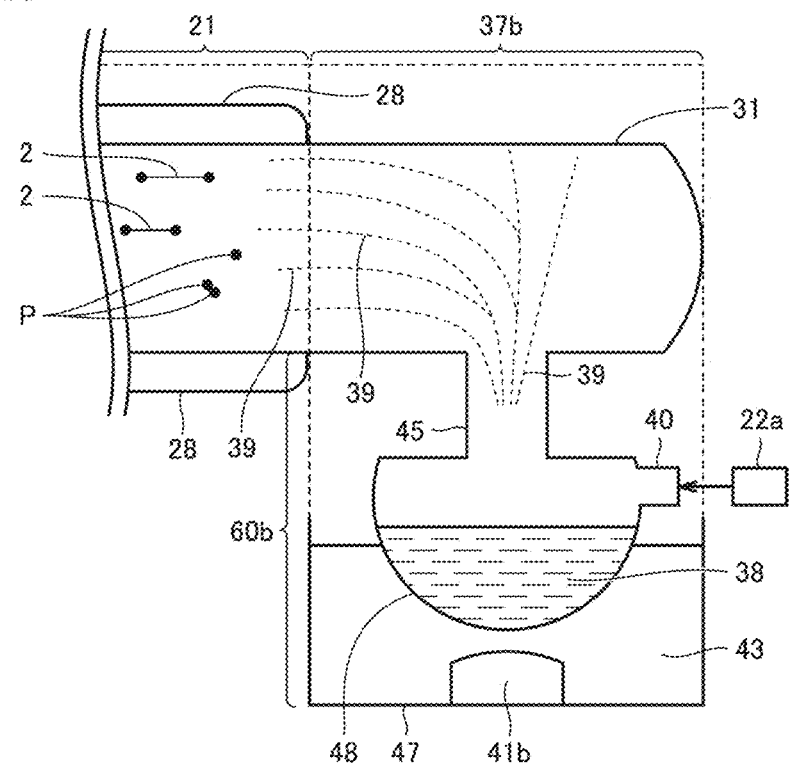
FIG. 3 is a diagram showing another example of the mist generating unit.
Figure 4:
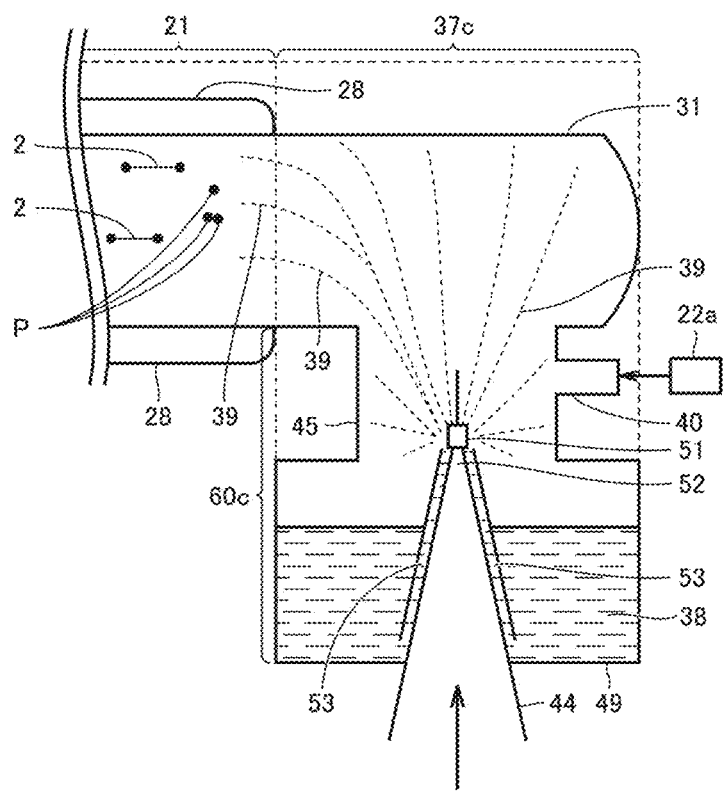
FIG. 4 is a diagram showing still another example of the mist generating unit.

A specific example of a method for applying ultrasonic vibration to the mist source material liquid will now be described with reference to FIGS. 2 to 4. FIGS. 2 to 4 are diagrams each showing an example of mist generating unit 37 (FIG. 1).

A mist generating unit 37a shown in FIG. 2 includes a reactor tube 31 immediately adjacent to a reactor tube constituting CNT growing unit 21, and a mist generator 60a connected to reactor tube 31. That is, mist generating unit 37a is connected to CNT growing unit 21.

Mist generator 60a includes a horn transducer 41a and a mesh 42 disposed to face a vibrating surface of horn transducer 41a. Mist source material liquid 38 is supplied between the vibrating surface of horn transducer 41a and mesh 42. Horn transducer 41a applies ultrasonic vibration to mist source material liquid 38 supplied between the vibrating surface of horn transducer 41a and mesh 42. As a result, mist source material liquid 38 passes through the holes of the mesh and is thus atomized to form mist 39.

A connecting portion 45 connected to reactor tube 31 is provided above mesh 42. Mist 39 generated by mist generator 60a is supplied into reactor tube 31 via connecting portion 45.

Connecting portion 45 may be provided with gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

As used herein, a mesh is defined as a thin plate having a plurality of minute openings. The opening is shaped circularly, elliptically, polygonally or the like. Inter alia, it is preferably shaped circularly from the viewpoint of generating a mist having a uniform particle diameter.

In mist generating unit 37a shown in FIG. 2, mist source material liquid 38 is atomized by passing through the holes of mesh 42. Therefore, by adjusting the diameter of the opening of the mesh, the mist's average particle diameter can be adjusted to a desired size.

The mesh preferably has the opening with a diameter of 1 μm or more and 50 μm or less, more preferably 3 μm or more and 40 μm or less, and still more preferably 5 μm or more and 30 μm or less. When the diameter of the opening is 1 μm or more and 50 μm or less, a mist obtained through the mesh can have an average particle diameter of 0.1 μm or more and 50 μm or less. When the diameter of the opening is less than 1 μm, clogging tends to occur. On the other hand, when the diameter of the opening exceeds 50 μm, coarsening of catalyst particles tends to occur in a heat treatment step during the CNT growth process. Herein, the diameter of the opening is defined as a diameter of a circle having an equal opening area (an equivalent circular diameter of the equal opening area).

The mesh preferably has 2 or more and 400 or less openings per $mm^2$, more preferably 10 or more and 200 or less openings per $mm^2$, and still more preferably 20 or more and 100 or less openings per $mm^2$. When the mesh has less than two openings per $mm^2$, efficiency of generating the mist tends to be significantly reduced. On the other hand, when the mesh has more than 400 openings per $mm^2$, then, after the mist is generated, liquid droplets tend to condense and thus prevent the catalyst from becoming fine particles.

The mesh preferably has a thickness of 1 μm or more and 500 μm or less, more preferably 5 μm or more and 250 μm or less, and still more preferably 10 μm or more and 100 μm or less. When the mesh has a thickness of less than 1 μm, it tends to be reduced in resistance against repeated use. On the other hand, when the mesh has a thickness exceeding 500 μm, it tends to inhibit generation of mist as ultrasonic vibration cannot be efficiently applied.

The mesh may be made of stainless steel, for example.

The horn transducer preferably has a frequency 50 kHz or more and 400 kHz or less, more preferably 70 kHz or more and 300 kHz or less, and still more preferably 100 kHz or more and 200 kHz or less. When the frequency of the horn transducer is less than 50 kHz, it is not preferable as efficiency of generating a mist is reduced. On the other hand, when the frequency of the horn transducer exceeds 400 kHz, it is not preferable as it tends to induce early deterioration of the mesh.

A mist generating unit 37b shown in FIG. 3 includes reactor tube 31 immediately adjacent to the reactor tube constituting CNT growing unit 21, and a mist generator 60b connected to reactor tube 31. That is, mist generating unit 37b is connected to CNT growing unit 21.

Mist generator 60b includes a first container 47 that holds water 43, a transducer 41b disposed at a bottom of first container 47, and a second container 48 disposed inside first container 47. At least a portion of an external surface of second container 48 is in contact with water 43. Mist source material liquid 38 is accommodated in second container 48. The second container is provided with gas introduction port 40 for externally introducing gas and connecting portion 45 connected to reactor tube 31.

A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

Transducer 41b vibrates to apply ultrasonic vibratory energy to the water. The ultrasonic vibratory energy concentrates on a surface of mist source material liquid 38, and mist source material liquid 38 is atomized by an effect of vibration (or through cavitation) to form mist 39. Mist 39 is supplied into reactor tube 31 through connecting portion 45 together with the gas introduced through gas introduction port 40.

A mist generating unit 37c shown in FIG. 4 includes reactor tube 31 immediately adjacent to the reactor tube constituting CNT growing unit 21, and a mist generator 60c connected to reactor tube 31. That is, mist generating unit 37c is connected to CNT growing unit 21.

Mist generator 60c includes a container 49 in which mist source material liquid 38 is accommodated, an air inlet port 44 for introducing compressed air generated by a compressor (not shown) into container 49, a nozzle 52 disposed above air inlet port 44 adjacently, a baffle 51 disposed above nozzle 52, and a pipe 53 allowing mist source material liquid 38 to reach the vicinity of nozzle 52.

When the compressed air introduced through air inlet port 44 is discharged through nozzle 52, a negative pressure effect is generated between nozzle 52 and pipe 53. By the negative pressure effect, mist source material liquid 38 is sucked up to an upper portion of pipe 53, collides against baffle 51, and atomizes into mist 39. Mist 39 is supplied into reactor tube 31 via connecting portion 45.

Connecting portion 45 may be provided with gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

<Growing Step>

In the growth step, mist 39 is heated to grow carbon nanotubes from catalyst particles P. The growing step is performed inside CNT growing unit 21.

When the mist is heated, the liquid carbon source included in the mist is used as a source material to grow CNTs on catalyst particles P present in the mist. In the present embodiment, a liquid carbon source included in the mist is used as a carbon source for CNTs, and it is thus unnecessary to use the carbon-containing gas as conventionally used. This is an advantage from the viewpoint of simplifying the CNT manufacturing process and reducing the cost thereof. While FIG. 1 shows mist 39 present in a vicinity of an upstream side of CNT growing unit 21, this is not exclusive. Mist 39 may be present throughout CNT growing unit 21.

The mist is heated preferably at a temperature of 800° C. or more and 1200° C. or less. That is, the growing step is preferably performed at a temperature of 800° C. or more and 1200° C. or less. If the temperature is less than 800° C., CNTs tend to be grown at a slower rate. On the other hand, when the temperature exceeds 1200° C., content of impurity carbon tends to increase. The growing step is performed under a condition in temperature of more preferably 900° C. or more and 1150° C. or less, and still more preferably 950° C. or more and 1050° C. or less.

The lower limit for the average flow velocity in the CNT growing unit of the carrier gas supplied from gas introduction port 40 is 0.05 cm/sec, preferably 0.1 cm/sec, and more preferably 0.2 cm/sec. On the other hand, the upper limit for the average flow velocity in CNT growing unit 21 is preferably 10 cm/sec, more preferably 5 cm/sec. When the average flow velocity of the carrier gas in CNT growing unit 21 is less than the lower limit, the mist tends to condense in a core tube at an unheated portion and thus liquefy. On the contrary, if the average flow velocity of the carrier gas in CNT growing unit 21 exceeds the upper limit, this tends to detach carbon nanotubes from catalyst particles P, which stops growth of carbon nanotubes and consequently inhibits formation of carbon nanotubes.

The lower limit for the Reynolds number of the flow in CNT growing unit 21 of the carrier gas supplied through gas introduction port 40 is preferably 0.01, and more preferably 0.05. On the other hand, the upper limit for the Reynolds number is 1000, preferably 100, and more preferably 10. If the Reynolds number is less than the lower limit, the apparatus is excessively restricted in design, which may make carbon nanotube assembled wire manufacturing apparatus 20 unnecessarily expensive and tends to unnecessarily lower efficiency of manufacturing carbon nanotubes. A Reynolds number exceeding the upper limit tends to disturb flow of carbon-containing gas and inhibit production of carbon nanotubes on catalyst particles P.

In the growing step, it is preferable that while mist 39 is heated in the flow of the carrier gas, a plurality of mutually closely adhering catalyst particles are separated from one another to grow carbon nanotubes between the plurality of catalyst particles to obtain CNTs.

By heating the mist in the flow of the carrier gas, catalyst particles in the mist closely adhering to one another are separated, and at the same time, between the catalyst particles, CNTs are grown using as a source material a liquid carbon source included in the mist.

As the carrier gas supplied from gas supplying unit 22, for example, argon, helium, hydrogen, nitrogen, neon, krypton, or the like can be used.

<Drawing Step>

The method for manufacturing CNTs in accordance with the present embodiment may include a drawing step after the growing step. In the drawing step, a tensile force is applied to carbon nanotubes in a suspended state that are obtained in the growing step to draw the carbon nanotubes.

The drawing step is performed inside CNT growing unit 21 and CNT drawing unit 30, or inside CNT drawing unit 30. When the drawing step is also performed inside CNT growing unit 21, the drawing step is preferably performed in CNT growing unit 21 on a downstream side of the carbon-containing gas, that is, on a side closer to CNT drawing unit 30.

The tensile force is preferably applied to carbon nanotubes by varying the carrier gas in flow velocity. For example, by making an average flow velocity of the carrier gas on the downstream side larger than that of the carrier gas on the upstream side, a tensile force can be applied to the CNT in a direction toward the downstream side. When a tensile force acts on an end of the carbon nanotube, the carbon nanotube is pulled while extending from catalyst particle P, and thus drawn in the longitudinal direction while it is plastically deformed and reduced in diameter.

In the drawing step, the carbon nanotubes are preferably oriented and drawn in a direction along the flow of the carrier gas. According to this, it is believed that the carbon nanotube is not easily bent, and a linear carbon nanotube having tube portion T composed only of a six-membered ring of carbon can be obtained. The carbon nanotube consisting of a six-membered ring of carbon is resistant to deterioration and can thus maintain quality.

The carrier gas on the downstream side preferably has an average flow velocity of 0.051 cm/sec or more and 10.001 cm/sec or less, and more preferably 0.201 cm/sec or more and 5.001 cm/sec or less. When the carrier gas on the downstream side has an average flow velocity of less than 0.051 cm/sec, the carbon nanotube tends to be drawn insufficiently faster than it is grown. On the contrary, if the carrier gas on the downstream side has an average flow velocity exceeding 10.001 cm/sec, this tends to detach carbon nanotubes from catalyst particles P, which stops growth of the carbon nanotubes and consequently inhibits formation of carbon nanotubes.

The carrier gas on the upstream side preferably has an average flow velocity of 0.050 cm/sec or more and 10.000 cm/sec or less, and more preferably 0.200 cm/sec or more and 5.000 cm/sec or less. If the carrier gas on the upstream side has an average flow velocity of less than 0.050 cm/sec, insufficient wind pressure is provided, and carbon nanotubes formed between catalyst particles P tend to grow stagnantly. On the contrary, if the carrier gas on the upstream side has an average flow velocity exceeding 10.000 cm/sec, this tends to detach carbon nanotubes from catalyst particles P, which stops growth of the carbon nanotubes and consequently inhibits formation of carbon nanotubes.

As a method for making the average flow velocity of the carrier gas on the downstream side larger than the average flow velocity of the carrier gas on the upstream side, for example, a hollow portion which passes the carrier gas is formed to have a cross section smaller in area on the downstream side of the carrier gas than the upstream side of the carrier gas. More specifically, a hollow portion in the CNT drawing unit (corresponding to the downstream side) passing the carbon-containing gas may have a cross section smaller in area than a hollow portion in the CNT growing unit (corresponding to the upstream side) passing the carbon-containing gas. This generates an acceleration field in the vicinity of a region in which the hollow portion has a cross section reduced in area, and provides the carrier gas with a faster flow velocity.

Figure 5:
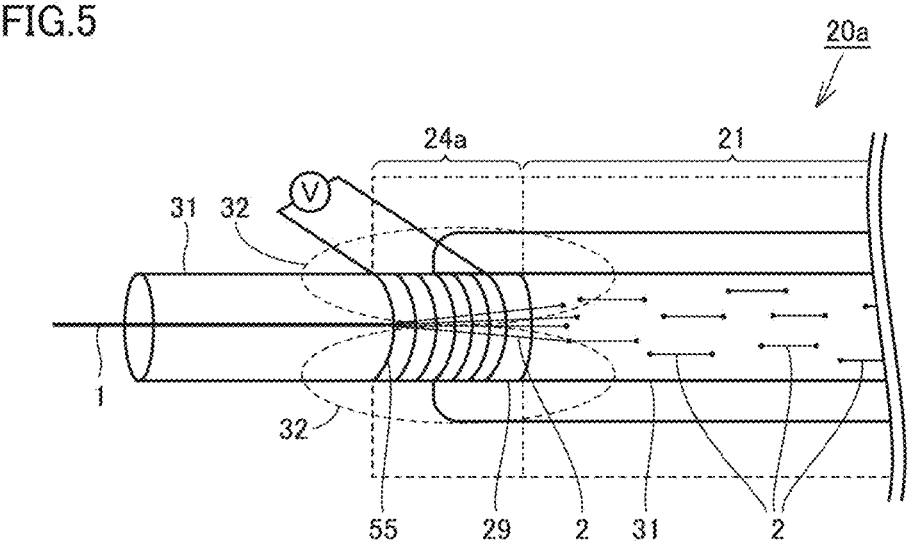
FIG. 5 is a diagram for illustrating an electric field generation unit of a carbon nanotube assembled wire manufacturing apparatus in accordance with another embodiment of the present disclosure.

The tensile force can be applied to a plurality of carbon nanotubes by using a magnetic field. A specific example of using a magnetic field as tensile force will now be described with reference to FIG. 5. FIG. 5 is a diagram showing a vicinity of a magnetic field generator. As shown in FIG. 5, in a CNT drawing unit 30a located on a downstream side of the carrier gas, an electric wire 55 can be disposed in the form of a coil surrounding a reactor tube 31 and a current can be passed through electric wire 55 to generate a magnetic line of force 32 inside reactor tube 31 in a direction along the central axis of reactor tube 31 to apply tensile force derived from a magnetic field to a CNT. By applying a magnetic field when drawing a CNT, a magnetic force directly acts on metal included in the CNT, and the CNT can be oriented and drawn in a direction along magnetic line of force 32 passing inside the reactor tube.

Figure 6:
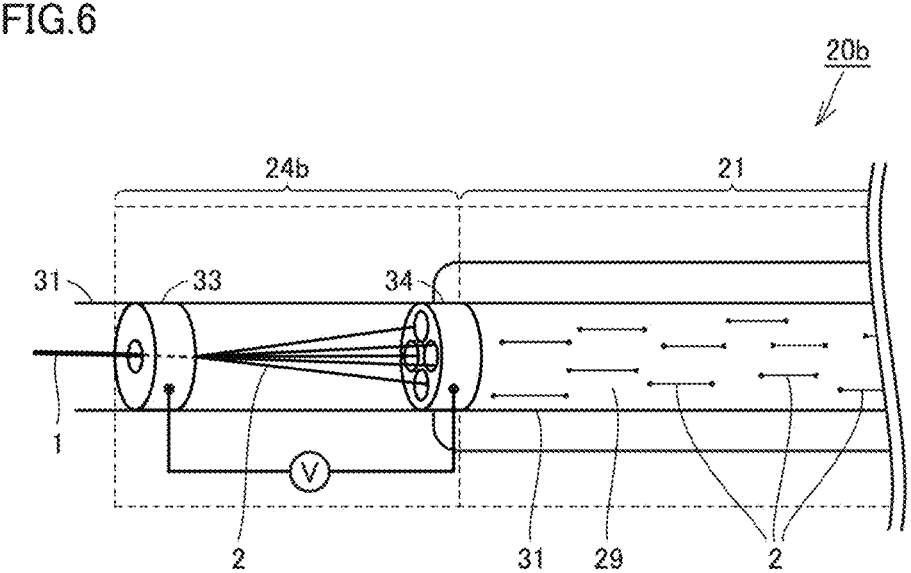
FIG. 6 is a diagram for illustrating a magnetic field generation unit of a carbon nanotube assembled wire manufacturing apparatus in accordance with another embodiment of the present disclosure.

The tensile force can be applied to a plurality of carbon nanotubes by using an electric field. A specific example of using an electric field as tensile force will now be described with reference to FIG. 6. FIG. 6 is a diagram showing a vicinity of an electric field generator. As shown in FIG. 6, in a CNT drawing unit 30b, a positive electrode 33 made of a conductive material can be disposed on a downstream side of the carbon-containing gas and a negative electrode 34 made of a conductive material can be disposed on an upstream side of the carbon-containing gas, and an electric field along the central axis of reactor tube 31 can be generated to allow tensile force derived from the electric field to be applied to a CNT. By applying an electric field when drawing a CNT, electrostatic force acts directly on the CNT and metal included in the CNT, and the CNT can be oriented in a direction along an electric line of force and thus drawn.

In the drawing step, a carbon nanotube grown on catalyst particle P is grown while being stretched by using tensile force, and the tube portion can be formed at an extremely larger rate than the carbon nanotube is grown on catalyst particle P. Thus, a long carbon nanotube can be formed in a relatively short period of time. Thus, a sufficiently long carbon nanotube can be formed even if a condition allowing the carbon nanotube to be continuously grown on catalyst particle P can only be maintained for a short period of time.

It is believed that in the drawing step, causing a tensile force to act on a carbon nanotube on catalyst particle P promotes incorporation of carbon atoms at a growth point of the carbon nanotube. Thus, it is believed that the carbon nanotube can be grown further faster and hence increased in length further faster.

It is believed that, in the drawing step, by causing tensile force to act on a carbon nanotube on catalyst particle P, the carbon nanotube is less likely to be curved, and thus a linear carbon nanotube composed of a cylindrical body formed of a sheet with tube portion T consisting of a six-membered ring of carbon can be obtained. The carbon nanotube consisting of a six-membered ring of carbon is resistant to deterioration and can thus maintain quality.

The length of the CNT obtained through the drawing step is preferably 10 μm or more, and further preferably 100 μm or more. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

Embodiment 2: Carbon Nanotube

A carbon nanotube manufactured in the method for manufacturing a carbon nanotube in accordance with Embodiment 1 will now be described.

(Shape of Carbon Nanotube)

The carbon nanotube can have a known structure. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, a cup stack-type nanotube having a structure in which graphenes in the shape of a bottomless paper cup are stacked, and the like.

Figure 7:
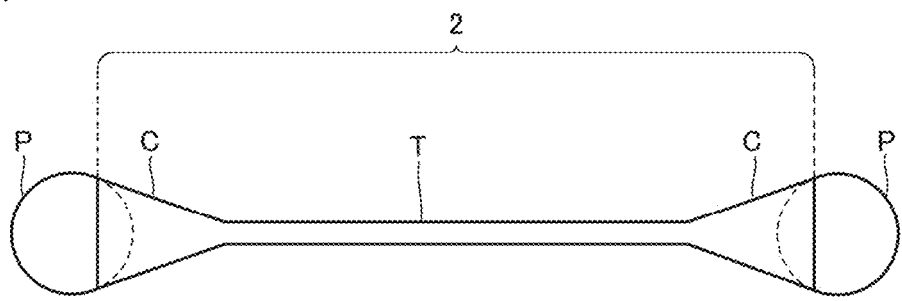
FIG. 7 is a diagram showing an example of a carbon nanotube used in one embodiment of the present disclosure.

The shape of the carbon nanotube is not particularly limited, and both a carbon nanotube having closed ends and a carbon nanotube having opened ends are also included. Further, as shown in FIG. 7, carbon nanotube 2 may have a tube portion T having one or both ends with a catalyst particle P, which is used in producing the carbon nanotube, adhering thereto. In addition, a cone portion C made of a conical graphene may be formed at one end or both ends of tube portion T of carbon nanotube 2.

Note that a carbon nanotube having opposite terminals with catalyst particles adhering thereto includes that: (i) the catalyst particles adhere to the CNT at the opposite terminals such that the catalyst particles are at least partially exposed from the carbon nanotube; (ii) the catalyst particles are completely embedded in the carbon nanotube at the opposite terminals and thus adhere thereto (see FIG. 8); (iii) the carbon nanotube has one terminal with a catalyst particle adhering thereto such that the catalyst particle is at least partially exposed from the carbon nanotube, and the carbon nanotube has the other terminal with a catalyst particle adhering thereto such that the catalyst particle is completely embedded in the carbon nanotube; and the like.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

The diameter of the carbon nanotube is preferably 0.6 nm or more and 20 nm or less, and further preferably 1 nm or more and 10 nm or less. In particular, when the diameter of the carbon nanotube is 1 nm or more and 10 nm or less, such a diameter is suitable from the viewpoint of heat resistance under oxidizing conditions.

In the present specification, a diameter of a carbon nanotube means an average outer diameter of a single CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes a cone portion at one end or both ends thereof, the diameter is measured at a location other than the cone portion.

(Catalyst Particle)

When a carbon nanotube has a catalyst particle adhering thereto, the catalyst particle preferably has a particle diameter of 0.6 nm or more and less than 30 nm. The catalyst particle originates from a catalyst (ferrocene ($Fe(C_5H_5)_2$), powdery iron oxide ($Fe_2O_3$), etc.) used in manufacturing a CNT assembled wire. The CNT in accordance with the present embodiment has adhering thereto a catalyst particle which has a particle diameter as small as less than 30 nm and is thus not coarsened, and hence does not affect the CNT's characteristic in electrical conductivity. Therefore, the CNT can be elongated while maintaining the CNT's inherent electrical conductivity.

The particle diameter of the catalyst particle adhering to the CNT can be measured in the following method: Initially, the carbon nanotube is observed with a transmission electron microscope (TEM) at a magnification of 100,000 to 500,000 times. Subsequently, in the TEM image, an outer diameter, which is a distance between farthest two points on the outer circumference of each catalyst particle, is measured.

What type the catalyst particle is of and how much it is contained can be confirmed and measured through energy dispersive X-ray spectrometry (EDX). A total content of catalyst particles in the CNT is preferably 0.1% or more and 50% or less, more preferably 1% or more and 40% or less, and still more preferably 5% or more and 20% or less based on atomicity.

Embodiment 3: Carbon Nanotube Manufacturing Apparatus

A carbon nanotube manufacturing apparatus used in the method for manufacturing a carbon nanotube in accordance with Embodiment 1 will now be described with reference to FIG. 1. Carbon nanotube manufacturing apparatus 50 shown in FIG. 1 comprises: mist generating unit 37 that generates mist 39 including a catalyst particle and a liquid carbon source; and tubular carbon nanotube growing unit (hereinafter also referred to as CNT growing unit) 21 that is connected to mist generating unit 37 and grows a carbon nanotube from the catalyst particle by heating mist 39. The carbon nanotube manufacturing apparatus can further comprise gas supplying unit 22 that supplies a carrier gas into mist generating unit 37.

<Mist Generating Unit>

Mist generating unit 37 generates mist 39 including a plurality of catalyst particles and a liquid carbon source. Mist generating unit 37 can apply ultrasonic vibration to mist source material liquid 38 including the catalyst particles and the liquid carbon source to atomize mist source material liquid 38 to generate mist 39.

Mist generating unit 37 (FIG. 18) can for example have a configuration shown in FIGS. 2 to 4. How the mist generating unit shown in FIGS. 2 to 4 is specifically configured will not be described as it has been described in Embodiment 1.

<Carbon Nanotube Growing Unit>

Carbon nanotube growing unit 21 is in the form of a tube that is a quartz tube for example. In CNT growing unit 21, carbon nanotubes 2 are formed on catalyst particles P by using as a source material a liquid carbon source included in the mist.

Carbon nanotube growing unit 21 is disposed in an electric furnace 28 and heated by a heater (not shown).

<Gas Supplying Unit>

Gas supplying unit 22 supplies a carrier gas into mist generating unit 37. Gas supplying unit 22 can include a gas cylinder (not shown) and a flow control valve (not shown). The carrier gas supplied from gas supplying unit 22 passes through mist generating unit 37 and enters CNT growing unit 21.

The type of the carrier gas supplied from gas supplying unit 22, the average flow velocity in the CNT growing unit, and the Reynolds number of the flow in the CNT growing unit can be the same as those described in Embodiment 1 for a method for manufacturing a CNT, and accordingly, they will not be described repeatedly.

Preferably, gas supplying unit 22 can repeatedly change the amount of the carrier gas to be supplied to CNT growing unit 21. This can increase/decrease the flow velocity of the carrier gas in CNT growing unit 21, which can help separating aggregated catalyst particles and thus increase the number of carbon nanotubes to be obtained.

<Other Configurations>

The CNT manufacturing apparatus can include, in addition to the above configuration, a CNT drawing unit that draws a CNT, a magnetic field generation unit that generates a magnetic field, an electric field generation unit that generates an electric field, and the like.

Embodiment 4: Method for Manufacturing Carbon Nanotube Assembled Wire

A method for manufacturing a carbon nanotube assembled wire in accordance with Embodiment 4 comprises: a mist generating step of generating a mist including a plurality of catalyst particles and a liquid carbon source; a growing step of growing one or more carbon nanotubes from each of the plurality of catalyst particles by heating the mist; and an assembling step of obtaining a carbon nanotube assembled wire by orienting and assembling the carbon nanotubes in their longitudinal direction.

Figure 9:
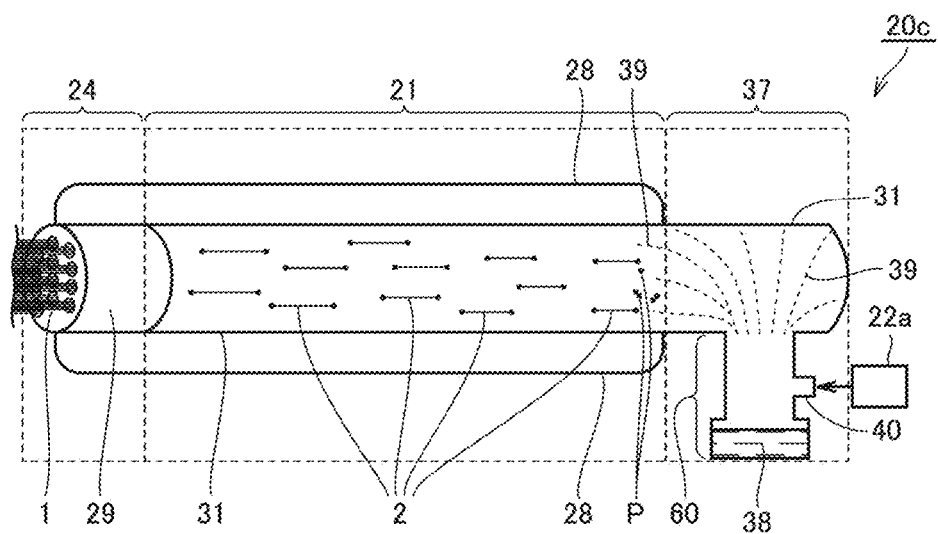
FIG. 9 is a diagram for illustrating a representative configuration example of a carbon nanotube assembled wire manufacturing apparatus in accordance with another embodiment of the present disclosure.

The method for manufacturing a carbon nanotube assembled wire in accordance with Embodiment 4 can for example employ a carbon nanotube assembled wire manufacturing apparatus 20c shown in FIG. 9.

Carbon nanotube assembled wire manufacturing apparatus 20c can comprise: mist generating unit 37 that generates a mist including a plurality of catalyst particles and a liquid carbon source; tubular carbon nanotube growing unit 21 that is connected to mist generating unit 37 and grows one or more carbon nanotubes from each of the plurality of catalyst particles P by heating mist 39; and a carbon nanotube assembling unit 24 that is located on a side of one end of carbon nanotube growing unit 21 (in FIG. 18, the left end thereof), and obtains a carbon nanotube assembled wire by orienting and assembling the carbon nanotubes that are obtained in carbon nanotube growing unit 21 in their longitudinal direction.

<Mist Generating Step and Growing Step>

The mist generating step and the growing step in Embodiment 4 are the same as the mist generating step and the growing step described in Embodiment 1, and accordingly, will not be described repeatedly.

<Drawing Step>

The method for manufacturing a CNT assembled wire in accordance with Embodiment 4 can comprise a drawing step after the growing step. The drawing step in Embodiment 4 is the same as the drawing step described in Embodiment 1, and accordingly, will not be described repeatedly.

<Assembling Step>

Subsequently, the carbon nanotubes are oriented and assembled together in their longitudinal direction to obtain a carbon nanotube assembled wire. The assembling step is performed inside CNT assembling unit 24.

As a method for orienting and assembling CNTs together in their longitudinal direction, causing the CNTs to approach one another while they are oriented is considered. More specifically, a hollow portion in the CNT assembling unit passing the carrier gas may have a cross section smaller in area than a hollow portion in the CNT growing unit passing the carrier gas. More specifically, the CNT assembling unit may be a honeycomb structural body, and the honeycomb structural body may have through holes arranged to have a longitudinal direction along the flow of the carrier gas.

In the present specification, the honeycomb structural body means a porous body having a large number of narrow tubular through holes, as shown in FIG. 9 by a honeycomb structural body 29.

When the CNT assembling unit is formed of a honeycomb structural body, an area in cross section of each through hole is preferably 0.005 mm$^2$ or more and 100 mm$^2$ or less, preferably 0.01 mm$^2$ or more and 100 mm$^2$ or less, preferably 0.05 mm$^2$ or more and 100 mm$^2$ or less, preferably 0.1 mm$^2$ or more and 50 mm$^2$ or less, preferably 0.5 mm$^2$ or more and 10 mm$^2$ or less. When the area in cross section of the through hole is less than 0.005 mm$^2$, CNTs tend to clog the through hole. On the other hand, when the through hole has an area in cross section exceeding 100 mm$^2$, CNTs insufficiently approach one another, and tend to be unable to form an assembly.

When the area in cross section of the CNT assembling unit is more than 4 mm$^2$, CNTs are insufficiently assembled together, and there is a possibility that single CNTs may exist together with a CNT assembled wire. Therefore, when it is desired to collect a larger amount of CNT assembled wires, the area in cross section of the CNT assembling unit is preferably 0.005 mm$^2$ or more and 4 mm$^2$ or less, and more preferably 0.01 mm$^2$ or more and 4 mm$^2$ or less.

When the CNT assembling unit is formed of a honeycomb structural body, the honeycomb structural body, as seen in a direction along the through hole (i.e., the longitudinal direction), preferably has a length of 1 mm or more and 1 m or less, more preferably 10 mm or more and 50 cm or less, and still more preferably 15 mm or more and 10 cm or less. When the honeycomb structural body has a length of less than 1 mm in the direction along the through hole, the CNTs suspended in a vapor phase are insufficiently accelerated and a growth promoting effect tends to be suppressed. On the other hand, when the honeycomb structural body has a length exceeding 1 m in the direction along the through hole, an amount of CNTs deposited on the internal wall of the through hole is increased, and it tends to be difficult to collect the CNTs.

When the length of the CNT drawing unit is less than 20 mm, CNTs are insufficiently assembled together, and there is a possibility that single CNTs may exist together with a CNT assembled wire. Therefore, when it is desired to collect a larger amount of CNT assembled wires, the length of the CNT drawing unit is preferably 20 mm or more and 1 m or less.

The carrier gas in the CNT assembling unit preferably has an average flow velocity of 0.05 cm/sec or more and 10 cm/sec or less, and more preferably 0.2 cm/sec or more and 5 cm/sec or less. When the average flow velocity of the carrier gas is less than 0.05 cm/sec, a thin-film non-oriented CNT tends to be obtained. On the other hand, when the average flow velocity of the carrier gas exceeds 10 cm/sec, the carrier gas tends to arrive at the CNT assembling unit in an unreacted state and cause an incomplete decomposition reaction, resulting in adhesion of tar.

The drawing step and the assembling step can be performed simultaneously. Furthermore, the drawing step may be followed by an additional drawing step and the assembling step performed simultaneously. For example, when the honeycomb structural body is used as the CNT assembling unit, drawing CNTs and assembling the CNTs are simultaneously performed in the through holes of the honeycomb structural body.

In accordance with the above-described method for manufacturing a CNT assembled wire, a carrier gas can be supplied to the mist generating unit, the CNT growing unit, and the CNT assembling unit continuously, and a CNT assembled wire can be continuously manufactured without limitation on length. The CNT assembled wire can be adjusted in length, as appropriate, by adjusting the flow rate of the carrier gas, how long in time it is supplied, and the like.

The length of the CNT assembled wire obtained through the assembling step is preferably 100 μm or more, more preferably 1000 μm or more, and further preferably 10000 μm or more. Although the upper limit value for the length of the CNT assembled wire is not particularly limited, it is preferably 1 m or less from the viewpoint of manufacturing. The length of the CNT assembled wire can be measured through observation with an optical microscope or visual observation.

More Preferable Embodiments

Figure 15:
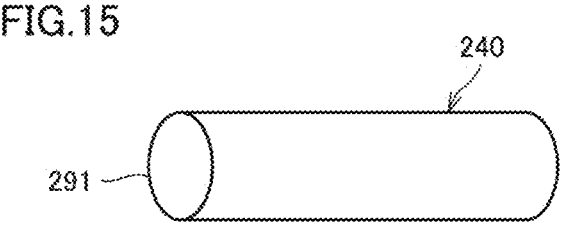
FIG. 15 is an enlarged view of a second flow channel of a carbon nanotube assembling unit.

A more preferable embodiment of the method for manufacturing a carbon nanotube assembled wire will now be described with reference to FIGS. 9 and 15. FIG. 9 is a diagram for illustrating a carbon nanotube assembled wire manufacturing apparatus in accordance with an embodiment of the present disclosure. FIG. 15 is an enlarged view of a second flow channel of the carbon nanotube assembling unit. In FIG. 15, the right side is the upstream side, and the left side is the downstream side.

Preferably, in the growing step, carbon nanotubes pass through a first flow channel, and in the assembling step, the carbon nanotubes pass through one or more second flow channels located downstream of the first flow channel, with each second flow channel having an area smaller in cross section than the first flow channel. In FIG. 9, the first flow channel corresponds to the hollow portion of CNT growing unit 21, and the second flow channel corresponds to the hollow portion of CNT assembling unit 24 (that is, the through holes of honeycomb structural body 29).

Thus, a tensile force toward the downstream side can be applied to the carbon nanotubes.

Preferably, an atmosphere downstream of the one or more second flow channels is lower in temperature than an atmosphere upstream of the one or more second flow channels. This helps CNTs to assemble together.

Preferably, the atmosphere upstream of the one or more second flow channels has a temperature of 800° C. or more, and the atmosphere downstream of the one or more second flow channels has a temperature of 600° C. or less. This helps CNTs to assemble together.

The atmosphere upstream of the one or more second flow channels preferably has a temperature of 800° C. or more and 1200° C. or less, preferably 900° C. or more and 1150° C. or less, and more preferably 950° C. or more and 1050° C. or less.

The atmosphere downstream of the one or more second flow channels preferably has a temperature of 600° C. or less, more preferably 500° C. or less, and still more preferably 300° C. or less. While the lower limit for the temperature of the atmosphere downstream of the one or more second flow channels is not particularly limited, it can for example be 80° C.

Preferably, an atmosphere inside the one or more second flow channels has temperature lower at a downstream side thereof than an upstream side thereof, and an atmosphere inside the one or more second flow channels at a downstream end thereof has a temperature of 600° C. or less. This helps CNTs to assemble together in the second flow channel. Herein, the downstream end in the second flow channel corresponds to an outlet 291 on a downstream side of a second flow channel 240 (i.e., a through hole of the honeycomb structural body) in FIG. 15.

The atmosphere inside the one or more second flow channels at the downstream end thereof more preferably has a temperature of 500° C. or less, and still more preferably 300° C. or less. While the lower limit for the temperature of the atmosphere inside the one or more second flow channels at the downstream end thereof is not particularly limited, it can for example be 80° C.

Preferably, a first region having an atmosphere with a temperature of 600° C. or less is present in the second flow channel on the downstream side, and the length of the first region in the longitudinal direction of the second flow channel is 1 cm or more. This helps CNTs to assemble together in the second flow channel.

The length of the first region in the longitudinal direction of the second flow channel is preferably 1 cm or more, and more preferably 5 cm or more. While the upper limit for the length of the first region in the longitudinal direction of the second flow channel is not particularly limited, it is preferably 20 cm, for example.

The area in cross section of each of the second flow channels is preferably 0.01 mm² or more and 4 mm² or less. Thus, the diameter of the CNT is reduced easily. The area in cross section of each of the second flow channels is more preferably 0.1 mm² or more and 2 mm² or less, and still more preferably 0.2 mm² or more and 1 mm² or less.

Preferably, a ratio S1/S2 is 100 or more and 1000000 or less, where S1 is an area in cross section of the first flow channel and S2 is an area in cross section of each of the second flow channels. This helps to draw the CNT and reduce the CNT in diameter. S1/S2 is more preferably 1000 or more and 100000 or less, and still more preferably 4000 or more and 40000 or less.

In the present specification, unless otherwise specified, the area in cross section of the first flow channel is fixed from the upstream side to the downstream side except for a portion of both ends thereof. In the present specification, unless otherwise specified, the area in cross section of each of the second flow channels is fixed from the upstream side to the downstream side except for a portion of both ends thereof. Herein, an area in cross section being fixed means that the area in cross section has a maximum value and a minimum value with an average value falling within ±5%.

Preferably, in the carbon nanotube assembling step, the carbon nanotubes are reduced in diameter. Thus, a CNT assembled wire including CNTs of a small diameter can be obtained.

Preferably, the one or more second flow channels each have a length of 10 mm or more and 200 mm or less. This helps to draw the CNT and reduce the CNT in diameter. The length of each of the second flow channels is more preferably 20 mm or more and 100 mm or less, and still more preferably 30 mm or more and 80 mm or less.

Embodiment 5: Carbon Nanotube Assembled Wire

<Carbon Nanotube Assembled Wire>

Figure 10:
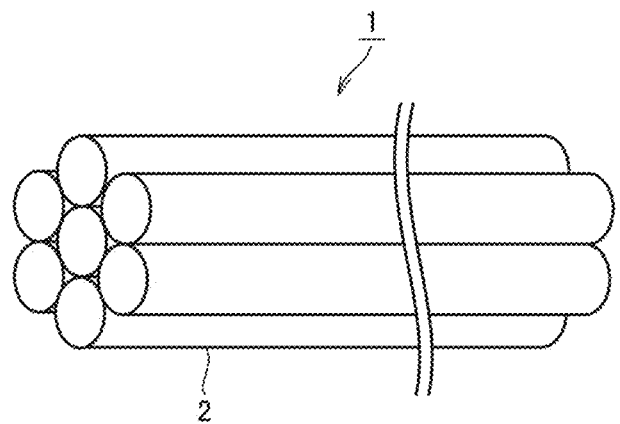
FIG. 10 is a diagram for illustrating a representative configuration example of a carbon nanotube assembled wire in accordance with an embodiment of the present disclosure.

A carbon nanotube assembled wire manufactured in the method for manufacturing a carbon nanotube assembled wire in accordance with Embodiment 4 will now be described with reference to FIG. 10. As shown in FIG. 10, preferably, a carbon nanotube assembled wire 1 includes a plurality of carbon nanotubes 2 and the plurality of carbon nanotubes 2 are oriented and assembled in their longitudinal direction.

(Carbon Nanotube)

In the present embodiment, as carbon nanotube 2, basically, the carbon nanotube described in Embodiment 2 can be used.

The length of the carbon nanotube can be selected as appropriate depending on the application. The length of the carbon nanotube is preferably 10 µm or more, and further preferably 100 µm or more, for example. In particular, when the length of the carbon nanotube is 100 µm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

The diameter of the carbon nanotube is preferably 0.6 nm or more and 20 nm or less, more preferably 1 nm or more and 10 nm or less, and still more preferably 1 nm or more and 2 nm or less. When the diameter of the carbon nanotube is 1 nm or more and 10 nm or less, it is suitable from the viewpoint of heat resistance under an oxidizing condition. When the diameter of the carbon nanotube is 0.6 nm or more and 2 nm or less, it is suitable from the viewpoint of enhancement in breaking strength.

In the present specification, a diameter of a carbon nanotube means an average outer diameter of a single CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes a cone portion at one end or both ends thereof, the diameter is measured at a location other than the cone portion.

(Shape of Carbon Nanotube Assembled Wire)

The carbon nanotube assembled wire has the shape of a yarn in which a plurality of carbon nanotubes are oriented and assembled together in their longitudinal direction.

The length of the carbon nanotube assembled wire is not particularly limited, and can be adjusted as appropriate depending on the application. The length of the CNT assembled wire is preferably 100 µm or more, more preferably 1000 µm or more, and further preferably 10 cm or more, for example. Although the upper limit value for the length of the CNT assembled wire is not particularly limited, it is preferably 1 m or less from the viewpoint of manufacturing. The length of the CNT assembled wire can be measured through observation with a scanning electron microscope, an optical microscope, or visual observation.

The size of the diameter of the carbon nanotube assembled wire is not particularly limited, and can be adjusted as appropriate depending on the application. The diameter of the CNT assembled wire is preferably 0.1 µm or more, and further preferably 1 µm or more, for example. Although the upper limit value for the diameter of the CNT assembled wire is not particularly limited, it is preferably 100 µm or less from the viewpoint of manufacturing. In the present embodiment, the size of the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is obtained by observing cross sections at two arbitrary positions of the single CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters.

(Catalyst Particle)

The carbon nanotube assembled wire can include catalyst particles. The catalyst particle preferably has an average particle diameter of 0.6 nm or more and less than 30 nm. The catalyst particle originates from a catalyst (ferrocene (Fe($C_5H_5$)$_2$), powdery iron oxide ($Fe_2O_3$), etc.) used in manufacturing a CNT assembled wire. The CNT assembled wire in accordance with the present embodiment has catalyst particles which have an average particle diameter as small as less than 30 nm and are thus not coarsened, and hence do not affect the CNT's characteristic in electrical conductivity. Therefore, the CNT assembled wire can be elongated while maintaining the CNT's inherent electrical conductivity.

Herein, the "average particle diameter" of the catalyst particles included in the CNT assembled wire means a median diameter (d50) in volume-based particle size distribution (volume distribution), and means an average particle diameter of all catalyst particles included in the CNT assembled wire. It should be noted that, in the present specification, an "average particle diameter" may simply be referred to as a "particle diameter."

The particle diameter of each particle for calculating the particle diameter (volume average particle diameter) of the catalyst particles included in the CNT assembled wire can be measured in the following method: Initially, the carbon nanotube assembled wire has any region (measurement field of view: 0.5 μm×0.5 μm) observed with a transmission electron microscope (TEM) at a magnification of 100,000 to 500,000 times. Subsequently, in the TEM image, an outer diameter, which is a distance between farthest two points on the outer circumference of each catalyst particle, is measured, and an average value of such outer diameters is calculated.

The catalyst particles included in the CNT assembled wire can include at least one type of metal element selected from the group consisting of iron, nickel, cobalt, molybdenum, gold, silver, copper, yttrium, chromium, palladium, platinum and tungsten. Herein, the catalyst particles including a metal element means both a case where the catalyst particle includes the metal element and another element (for example, sulfur, oxygen, etc.) together, and a case where the catalyst particle is composed of the metal element alone.

The catalyst particles included in the CNT assembled wire preferably include iron. In this case, the catalyst particle can be formed for example of an iron particle made of iron alone, or iron sulfide (FeS, $Fe_2S$), iron oxide ($Fe_2O_3$, $Fe_3O_4$). The catalyst particles are more preferably iron particles made of iron. Using iron as a catalyst is suitable from the viewpoint of mass production of CNTs. Therefore, when the catalyst particles include iron, elongate CNT assembled wires can be mass-produced.

What type of catalyst particle is included in the CNT assembled wire and how much the former is contained in the latter can be confirmed and measured through energy dispersive X-ray spectrometry (EDX). A total content of the metal elements in the CNT assembled wire is preferably 0.1% or more and 50% or less, more preferably 1% or more and 40% or less, and still more preferably 5% or more and 20% or less based on atomicity.

Embodiment 6: Carbon Nanotube Assembled Wire Manufacturing Apparatus

A carbon nanotube assembled wire manufacturing apparatus used in a method for manufacturing a carbon nanotube assembled wire in accordance with Embodiment 4 will now be described with reference to FIG. 9. Carbon nanotube assembled wire manufacturing apparatus 20c shown in FIG. 9 can comprise: mist generating unit 37 that generates a mist including a plurality of catalyst particles and a liquid carbon source; tubular carbon nanotube growing unit 21 that is connected to mist generating unit 37 and grows one or more carbon nanotubes from each of the plurality of catalyst particles P by heating mist 39; and carbon nanotube assembling unit 24 that is located on a side of one end of carbon nanotube growing unit 21 (in FIG. 9, the left end thereof), and obtains a carbon nanotube assembled wire by orienting and assembling the carbon nanotubes that are obtained in carbon nanotube growing unit 21 in their longitudinal direction.

<Mist Generating Unit, and Carbon Nanotube Growing Unit>

The mist generating unit and the carbon nanotube growing unit in Embodiment 6 are the same in configuration as the mist generating unit and the carbon nanotube growing unit described in Embodiment 3, and accordingly, will not be described repeatedly.

<Carbon Nanotube Assembling Unit>

Carbon nanotube assembling unit 24 is disposed at an end of CNT growing unit 21 opposite to gas supplying unit 23. That is, CNT assembling unit 24 is disposed downstream of CNT growing unit 21 as seen in the direction of the flow of the carrier gas. In CNT assembling unit 24, a carbon nanotube assembled wire is formed.

The CNT assembling unit may have any structure that can orient and assemble a plurality of suspended carbon nanotubes together in the direction of the flow of the carrier gas. For example, the CNT assembling unit can have a honeycomb structural body, a straight-tube-type narrow tube structure, or the like.

When the CNT assembling unit is composed of a honeycomb structural body, the honeycomb structural body is disposed in the carbon nanotube assembled wire manufacturing apparatus such that the through holes have a longitudinal direction along the flow of the carbon-containing gas.

When the CNT assembling unit is composed of a honeycomb structural body, it can be identical in configuration to that described for the method for manufacturing a CNT assembled wire in accordance with Embodiment 4, and accordingly, it will not be described repeatedly.

The honeycomb structural body can be made of a ceramic material (alumina, zirconia, aluminum nitride, silicon carbide, silicon nitride, forsterite, steatite, cordierite, mullite, ferrite, and the like), quartz glass, glass, metals, graphite. Inter alia, the ceramic material is preferable in view of heat resistance and durability required in manufacturing CNTs.

<Other Configurations>

The CNT assembled wire manufacturing apparatus can include, in addition to the above configuration, a CNT drawing unit that draws a CNT, a magnetic field generation unit that generates a magnetic field, an electric field generation unit that generates an electric field, and the like.

More Preferable Embodiments

A more preferable embodiment of the carbon nanotube assembled wire manufacturing apparatus will now be described below.

Preferably, the carbon nanotube growing unit has a first flow channel therein, and the carbon nanotube assembling unit has one or more second flow channels therein, with each second flow channel having an area in cross section smaller than the first flow channel. In FIG. 9, the first flow channel corresponds to the hollow portion of CNT growing unit 21, and the second flow channel corresponds to the hollow portion of CNT assembling unit 24 (that is, the through holes of honeycomb structural body 29).

Thus, a tensile force toward the downstream side can be applied to the carbon nanotubes.

Preferably, the carbon nanotube assembling unit has a honeycomb structure having a plurality of second flow channels composed of a plurality of through holes, and each second flow channel has an area in cross section of 0.01 $mm^2$ or more and 4 $mm^2$ or less. Thus, the diameter of the CNT is reduced easily. More preferably, each second flow channel has an area in cross section of 0.02 $mm^2$ or more and 2 $mm^2$ or less, and still more preferably 0.1 $mm^2$ or more and 1 $mm^2$ or less.

Preferably, a ratio S1/S2 is 100 or more and 1000000 or less, where S1 is an area in cross section of the first flow channel and S2 is an area in cross section of each of the second flow channels. This helps to draw the CNT and reduce the CNT in diameter. S1/S2 is more preferably 1000 or more and 100000 or less, and still more preferably 2000 or more and 20000 or less.

Preferably, in the carbon nanotube assembling unit, the carbon nanotubes are reduced in diameter. Thus, a CNT assembled wire including CNTs of a small diameter can be obtained.

Preferably, the second flow channels of the carbon nanotube assembling unit each have a length of 10 mm or more and 200 mm or less. This helps to draw the CNT and reduce the CNT in diameter. The length of each second flow channel is more preferably 20 mm or more and 100 mm or less, and still more preferably 30 mm or more and 50 mm or less.

Embodiment 7: Method for Manufacturing Carbon Nanotube Assembled Wire Bundle

A method for manufacturing a carbon nanotube assembled wire bundle in accordance with Embodiment 7 can include: a mist generating step of generating a mist including a plurality of catalyst particles and a liquid carbon source; a growing step of growing one or more carbon nanotubes from each of the plurality of catalyst particles by heating the mist; an assembling step of obtaining a plurality of carbon nanotube assembled wires by orienting and assembling the carbon nanotubes in their longitudinal direction; and a bundling step of orienting the plurality of carbon nanotube assembled wires in their longitudinal direction and thus bundling them together to obtain a carbon nanotube assembled wire bundle.

<Mist Generating Step and Growing Step>

The mist generating step and the growing step in Embodiment 7 are the same as the mist generating step and the growing step described in Embodiment 1, and accordingly, will not be described repeatedly.

<Assembling Step>

The assembling step in Embodiment 7 is the same as the assembling step described in Embodiment 4, and accordingly, will not be described repeatedly.

<Bundling Step>

In the bundling step, a plurality of carbon nanotube assembled wires are oriented in their longitudinal direction and thus bundled together to obtain a carbon nanotube assembled wire bundle.

The bundling step and the assembling step can be performed simultaneously. That is, in the assembling step, in parallel with production of CNT assembled wires, the obtained CNT assembled wires can be oriented in a direction along their longitudinal direction and thus bundled together to obtain a CNT assembled wire bundle. In this case, the bundling step is performed inside CNT assembling unit 24.

The bundling step may be performed independently after the assembling step. That is, the bundling step can be performed after CNT assembled wires are produced in the assembling step. In this case, a CNT bundling unit is preferably connected downstream of CNT assembling unit 24 as seen in the direction of the flow of the carrier gas.

The CNT bundling unit can for example be a honeycomb structural body, a straight-tube-type narrow tube structure, or the like.

Preferably, the bundling step includes: an adhering step of adhering a volatile liquid to the plurality of carbon nanotube assembled wires; and an evaporating step of evaporating the volatile liquid adhered to the carbon nanotube assembled wires. Thus, the obtained CNT assembled wire bundle has an increased density.

Examples of the volatile liquid include methanol, ethanol, isopropyl alcohol, acetone, methyl ethyl ketone, xylene, anisole, toluene, cresol, pyrrolidone, carbitol, carbitol acetate, water, an epoxy monomer, and an acrylic monomer. The volatile liquid include monomer or resin. Xylene can be used.

Preferably, the adhering step is performed before orienting and bundling the plurality of carbon nanotube assembled wires in the direction along the longitudinal direction of the plurality of carbon nanotube assembled wires. This allows carbon nanotubes to be brought into close contact with one another uniformly and at a high density while the liquid with which the carbon nanotubes have gaps impregnated evaporates and thus escapes.

Preferably, the adhering step is performed after orienting and bundling the plurality of carbon nanotube assembled wires in the direction along the longitudinal direction of the plurality of carbon nanotube assembled wires. This allows carbon nanotubes to be brought into close contact with one another uniformly and at a high density while the liquid with which the carbon nanotubes have gaps impregnated evaporates and thus escapes.

The evaporating step can be performed by natural drying.

Preferably, the bundling step is performed while tension is applied to the plurality of carbon nanotube assembled wires. Thus, the obtained CNT assembled wire bundle has an enhanced strength.

Embodiment 8: Carbon Nanotube Assembled Wire Bundle

Figure 11:
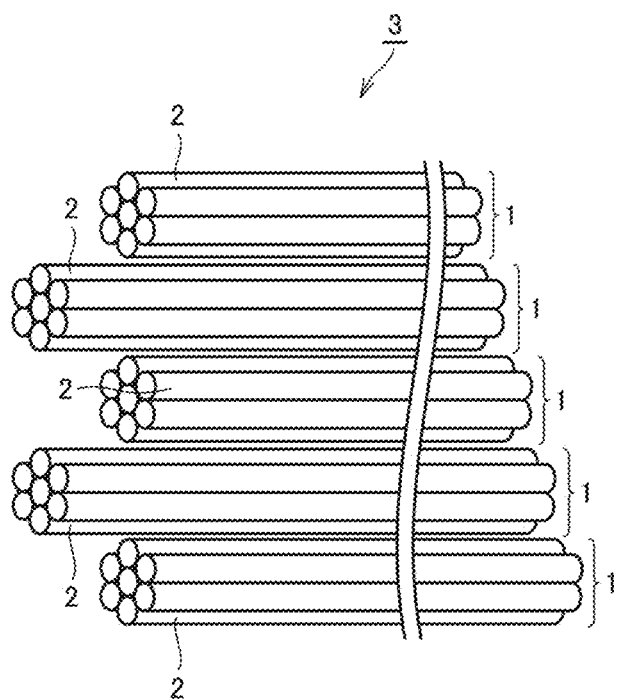
FIG. 11 is a diagram for illustrating a representative configuration example of a carbon nanotube assembled wire bundle in accordance with an embodiment of the present disclosure.

A carbon nanotube assembled wire bundle manufactured in the method for manufacturing a carbon nanotube assembled wire bundle in accordance with Embodiment 7 will now be described with reference to FIG. 11. As shown in FIG. 11, a carbon nanotube assembled wire bundle 3 includes a plurality of carbon nanotube assembled wires 1 and the plurality of carbon nanotube assembled wires are oriented and assembled in their longitudinal direction.

(Shape of Carbon Nanotube Assembled Wire Bundle)

The carbon nanotube assembled wire bundle has the shape of a string in which a plurality of carbon nanotube assembled wires are oriented and assembled together in their longitudinal direction. The fact that the carbon nanotube assembled wire bundle has the shape of a string in which a plurality of carbon nanotube assembled wires are oriented and assembled together in their longitudinal direction can be confirmed by observation with an optical microscope or a scanning electron microscope.

The length of the carbon nanotube assembled wire bundle is not particularly limited, and can be adjusted as appropriate depending on the application. The length of the CNT assembled wire bundle is preferably 100 µm or more, more preferably 1000 µm or more, and further preferably 10 cm or more, for example. Although the upper limit value for the length of the CNT assembled wire bundle is not particularly limited, it is preferably 1 m or less from the viewpoint of manufacturing. The length of the CNT assembled wire bundle can be measured through observation with an optical microscope or visual observation.

The size of the diameter of the carbon nanotube assembled wire bundle is not particularly limited, and can be adjusted as appropriate depending on the application. The diameter of the CNT assembled wire bundle is preferably 1

μm or more, and further preferably 10 μm or more, for example. Although the upper limit value for the diameter of the CNT assembled wire bundle is not particularly limited, it is preferably 1000 μm or less from the viewpoint of manufacturing. In the present embodiment, the size of the diameter of the CNT assembled wire bundle is smaller than the length of the CNT assembled wire bundle.

In the present specification, the diameter of the carbon nanotube assembled wire bundle means an average outer diameter of a single CNT assembled wire bundle. The average outer diameter of a single CNT assembled wire bundle is obtained by observing cross sections at two arbitrary positions of the single CNT assembled wire bundle with an optical microscope, measuring, in each cross section, an outer diameter, which is the distance between farthest two points on the outer circumference of the CNT assembled wire bundle, and calculating an average value of the obtained outer diameters.

(Catalyst Particle)

The carbon nanotube assembled wire can include catalyst particles. The catalyst particle is identical to that adhering to a CNT in Embodiment 2, and accordingly, it will not be described repeatedly.

What type of catalyst particle is included in the CNT assembled wire bundle and how much the former is contained in the latter can be confirmed and measured through energy dispersive X-ray spectrometry (EDX). A total content of the catalyst particles in the CNT assembled wire bundle is preferably 0.1% or more and 50% or less, more preferably 1% or more and 40% or less, and still more preferably 5% or more and 20% or less based on atomicity.

Embodiment 9: Carbon Nanotube Assembled Wire Bundle Manufacturing Apparatus

Figure 16:
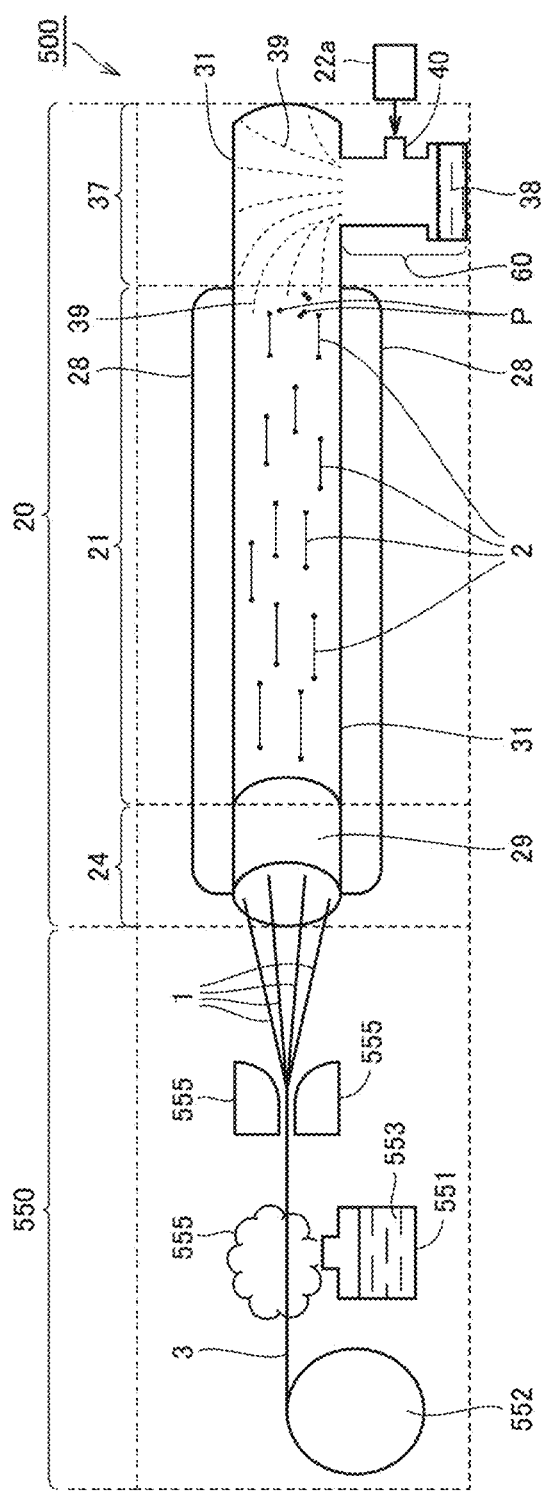
FIG. 16 is a diagram of a carbon nanotube assembled wire bundle manufacturing apparatus in accordance with an embodiment of the present disclosure.
Figure 17:
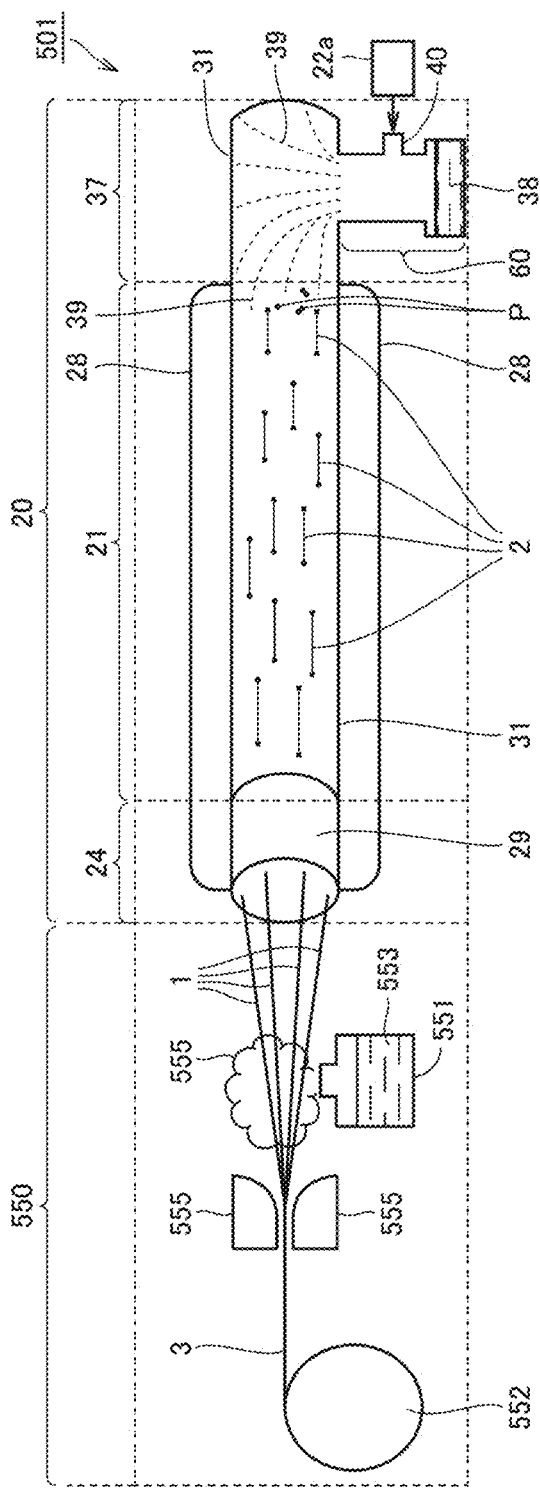
FIG. 17 is a diagram of another example of the carbon nanotube assembled wire bundle manufacturing apparatus in accordance with an embodiment of the present disclosure.

A carbon nanotube assembled wire bundle manufacturing apparatus used in manufacturing a carbon nanotube assembled wire bundle in accordance with Embodiment 7 will now be described with reference to FIGS. 16 and 17. FIGS. 16 and 17 are diagrams showing a carbon nanotube assembled wire bundle manufacturing apparatus.

Carbon nanotube assembled wire bundle manufacturing apparatuses 500, 501 can comprise: carbon nanotube assembled wire manufacturing apparatus 20 described in Embodiment 6; and a bundling unit 550 that obtains a carbon nanotube assembled wire bundle by orienting and bundling a plurality of carbon nanotube assembled wires, which are obtained by the carbon nanotube assembled wire manufacturing apparatus, in a direction along the longitudinal direction of the plurality of carbon nanotube assembled wires.

Carbon nanotube assembled wire manufacturing apparatus 20 can have the same structure as that of the carbon nanotube assembled wire manufacturing apparatus described for Embodiment 6, and accordingly, it will not be described repeatedly.

<Bundling Unit>

In bundling unit 550, a plurality of suspended CNT assembled wires are oriented in their longitudinal direction and thus bundled together to form a carbon nanotube assembled wire bundle.

The bundling unit may have any structure that can orient a plurality of carbon nanotube assembled wires that are obtained in a carbon nanotube assembled wire manufacturing apparatus, and assemble them together in their longitudinal direction.

For example, the bundling unit can have a honeycomb structural body, a straight-tube-type narrow tube structure, or the like.

When the bundling unit has a honeycomb structural body, the honeycomb structural body is disposed in the carbon nanotube assembled wire bundle manufacturing apparatus such that the through holes have a longitudinal direction along the flow of the carbon-containing gas.

When the bundling unit has a honeycomb structural body, it can be identical in configuration to that described for the above-described CNT assembled wire manufacturing apparatus.

The bundling unit can have a structure shared by the carbon nanotube assembling unit. That is, the CNT assembling unit can also function as the bundling unit.

The bundling unit can have a structure separate from the carbon nanotube assembling unit. In this case, the bundling unit is preferably disposed downstream of CNT assembling unit 24 as seen in the direction of the flow of the carbon-containing gas. For example, preferably, a diaphragm 555 is provided to the bundling unit disposed downstream of a CNT assembled wire, and a plurality of carbon nanotube assembled wires 1 are passed through diaphragm 555 and thus oriented and assembled together in their longitudinal direction.

Preferably, bundling unit 550 includes a liquid adhering apparatus 551 that adheres a volatile liquid 553 to the plurality of carbon nanotube assembled wires 1. Thus, a CNT assembled wire bundle having a high density can be provided.

As a method for adhering the volatile liquid to a carbon nanotube assembled wire, for example, atomizing the volatile liquid into vapor 555 and spraying vapor 555 to the carbon nanotube assembled wire are considered.

Liquid adhering apparatus 551 is disposed at a position where carbon nanotube assembled wire 1 can be exposed to the volatile liquid. For example, as shown in FIG. 16, liquid adhering apparatus 551 can be disposed downstream of diaphragm 555. Further, as shown in FIG. 17, liquid adhering apparatus 551 can be disposed upstream of diaphragm 555.

Preferably, the bundling unit includes a winding apparatus 552 that orients, bundles and winds a plurality of carbon nanotube assembled wires in a direction along the longitudinal direction of the plurality of carbon nanotube assembled wires while applying tension to the plurality of carbon nanotube assembled wires.

Thus, a CNT assembled wire bundle having a high density can be provided.

<Other Configurations>

The CNT assembled wire bundle manufacturing apparatus can include, in addition to the above configuration, a CNT drawing unit that draws a CNT, a magnetic field generation unit that generates a magnetic field, an electric field generation unit that generates an electric field, and the like.

EXAMPLES

The embodiments will now be described more specifically with reference to examples. However, the embodiments are not limited by these examples.

[Study 1: Studying Carbon Nanotube]

<Preparing Carbon Nanotube Manufacturing Apparatus>

(Apparatus 1)

As an apparatus 1, a carbon nanotube assembled wire manufacturing apparatus having a configuration similar to that of the carbon nanotube manufacturing apparatus outlined in FIG. 1 was prepared. Specifically, carbon nanotube growing unit 21 and carbon nanotube drawing unit 30 are disposed in electric furnace 28. The CNT growing unit is a quartz tube having an inner diameter of 25 mm and a length of 50 mm. The CNT drawing unit is a quartz tube having an inner diameter of 4 mm and a length of 200 mm.

Mist generating unit 37 is disposed on a side of CNT growing unit 21 opposite to a side thereof where CNT drawing unit 30 is disposed. Mist generating unit 37 has a configuration similar to mist generating unit 37a shown in FIG. 2. Mist generating unit 37a includes a quartz tube connected to CNT growing unit 21 and having an inner diameter of 25 mm and a length of 200 mm, and mist generator 60a connected to the quartz tube. Gas introduction port 40 is provided at connecting portion 45 of mist generator 60a. A carrier gas is supplied from gas supplying unit 22 to gas introduction port 40, passes through mist generating unit 37a, and enters CNT growing unit 21.

Mist generator 60a includes horn transducer 41a and mesh 42 disposed to face a vibrating surface of horn transducer 41a. The mesh is made of a metal plate having a thickness of 10 μm, and has 100 openings per $mm^2$ each in the form of a circle having a diameter of 20 μm. The horn transducer has a frequency of 110 kHz.

<Producing Carbon Nanotube Assembled Wires>

Carbon nanotube assembled wires for samples 1-1 and 1-2 were produced using apparatus 1 as a manufacturing apparatus.

For sample 1-1, ferrocene was dispersed in ethanol to produce a mist source material liquid. The concentration of the ferrocene in the mist source material liquid is 1% by weight.

For sample 1-2, powdery iron oxide ($Fe_2O_3$, with an average particle diameter of 70 nm) was dispersed in ethanol to produce a mist source material liquid. The concentration of the powdery iron oxide in the mist source material liquid was 2% by weight.

With the mist source material liquid used to generate a mist by mist generator 60a, the electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. The mist had an average particle diameter of 35 μm. Thus, CNTs were grown in the CNT growing unit.

Figure 8:
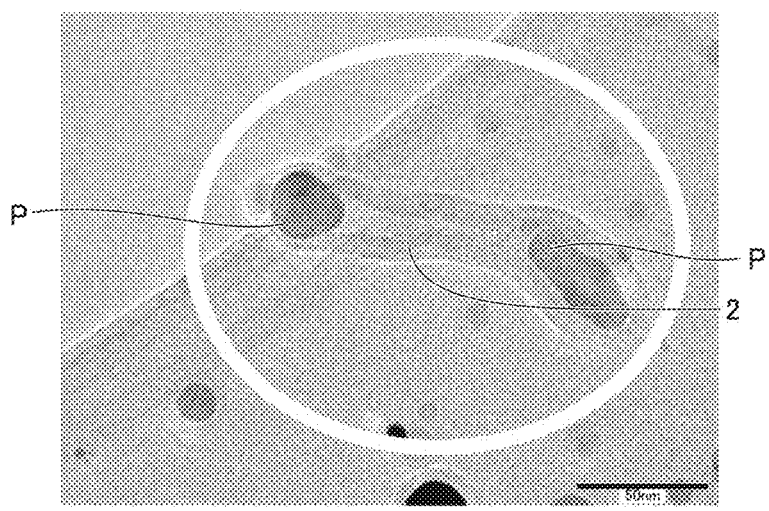
FIG. 8 is a transmission electron microscope (TEM) image of a carbon nanotube in accordance with one embodiment of the present disclosure.

Thereafter, for any of samples 1-1 and 1-2, CNTs were drawn in the CNT drawing unit and thus obtained. FIG. 8 shows a TEM image of one example of a carbon nanotube obtained in sample 1-2.

<Measuring Carbon Nanotube>

(Shape)

The carbon nanotubes of samples 1-1 and 1-2 were measured in average length and average diameter. How the average length and the average diameter were measured is the same as has been described in Embodiment 2, and accordingly, it will not be described repeatedly.

The CNT of sample 1-1 had an average length of 10 cm and an average diameter of 55 μm.

The CNT of sample 1-2 had an average length of 15 cm and an average diameter of 60 μm.

When the carbon nanotubes of samples 1-1 and 1-2 were observed with a TEM, it has been confirmed that the carbon nanotubes each had one or opposite terminals with a catalyst particle adhering thereto.

(Catalyst Particle)

The carbon nanotube assembled wires of samples 1-1 and 1-2 were each subjected to EDX analysis to identify a composition of catalyst particles included in each CNT assembled wire.

It has been confirmed that the carbon nanotube assembled wires of samples 1-1 and 1-2 included catalyst particles of iron particles. In addition, through SEM observation and EDX analysis, it has been confirmed that the iron particles are dispersed in the CNT assembled wires longitudinally thereof.

Figure 12:
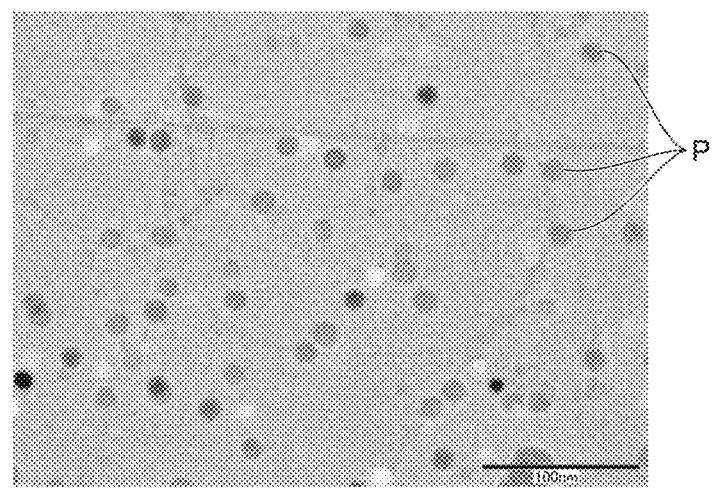
FIG. 12 is a transmission electron microscope (TEM) image of a carbon nanotube obtained for sample 2-2.

Further, when sample 1-2 was further observed with a SEM, it has been confirmed that the iron particles were substantially spherical and had a substantially uniform particle diameter, as shown in FIG. 12.

The carbon nanotubes of samples 1-1 and 1-2 had their catalyst particles subjected to measurement of particle diameter. How the catalyst particles' diameters were measured is the same as has been described in Embodiment 2, and accordingly, it will not be described repeatedly.

Sample 1-1 had catalyst particles with a particle diameter of 1 nm or more and 25 nm or less.

Sample 1-2 had catalyst particles with a particle diameter of 5 nm or more and 21 nm or less.

[Study 2: Studying Carbon Nanotube Assembled Wire]

<Preparing Carbon Nanotube Assembled Wire Manufacturing Apparatus>

(Apparatus 2)

As an apparatus 2, a carbon nanotube assembled wire manufacturing apparatus having a configuration similar to that of the carbon nanotube assembled wire manufacturing apparatus outlined in FIG. 9 was prepared. Specifically, carbon nanotube growing unit 21 and carbon nanotube assembling unit 24 are disposed in electric furnace 28. The CNT growing unit is a quartz tube having an inner diameter of 25 mm and a length of 50 mm. As carbon nanotube assembling unit 24, a ceramic honeycomb structural body is disposed in a quartz tube immediately adjacent to the CNT growing unit. The honeycomb structural body has about 200 through holes per inch, and each throughhole has an area in cross section of 0.8 $mm^2$.

Mist generating unit 37 is disposed on a side of CNT growing unit 21 opposite to a side thereof where CNT assembling unit 24 is disposed. Mist generating unit 37 has a configuration similar to mist generating unit 37a shown in FIG. 2. Mist generating unit 37a includes a quartz tube connected to CNT growing unit 21 and having an inner diameter of 25 mm and a length of 200 mm, and mist generator 60a connected to the quartz tube. Gas introduction port 40 is provided at connecting portion 45 of mist generator 60a. A carrier gas is supplied from gas supplying unit 22 to gas introduction port 40, passes through mist generating unit 37a, and enters CNT growing unit 21.

Mist generator 60a includes horn transducer 41a and mesh 42 disposed to face a vibrating surface of horn transducer 41a. The mesh is made of a metal plate having a thickness of 10 μm, and has 100 openings per $mm^2$ each in the form of a circle having a diameter of 20 μm. The horn transducer has a frequency of 110 kHz.

<Producing Carbon Nanotube Assembled Wires>

Carbon nanotube assembled wires for samples 2-1 and 2-2 were produced using apparatus 2 as a manufacturing apparatus.

For sample 2-1, ferrocene was dispersed in ethanol to produce a mist source material liquid. The concentration of the ferrocene in the mist source material liquid is 2% by weight.

For sample 2-2, powdery iron oxide ($Fe_2O_3$, with an average particle diameter of 50 nm) was dispersed in ethanol to produce a mist source material liquid. The concentration of the powdery iron oxide in the mist source material liquid was 3% by weight.

With the mist source material liquid used to generate a mist by mist generator 60a, the electric furnace's internal temperature was raised to 1000° C. while argon gas having an argon gas concentration of 100% by volume was supplied from the gas supplying unit into the CNT growing unit at a flow rate of 1500 cc/min (flow velocity: 5.1 cm/sec) for 50 minutes. The mist had an average particle diameter of 25 μm. Thus, CNTs were grown in the CNT growing unit.

Figure 13:
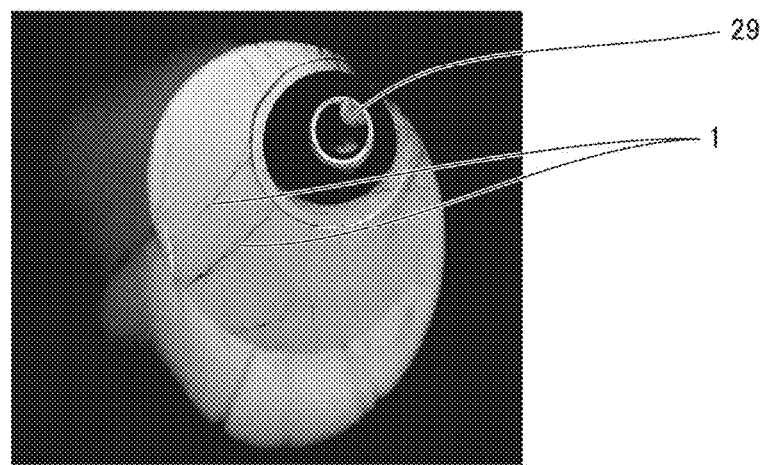
FIG. 13 is an image of a carbon nanotube assembled wire obtained for sample 2-2.

Thereafter, for any of samples 2-1 and 2-2, CNTs were drawn and assembled together in the CNT assembling unit and a CNT assembled wire was thus obtained. When a downstream side of the honeycomb structure constituting the CNT assembling unit of apparatus 2 was visually observed, then, for any of samples 2-1 and 2-2, it has been confirmed that carbon nanotube assembled wire 1 formed of a plurality of CNTs assembled together was discharged through a through hole of honeycomb structural body 29. FIG. 13 shows an image of the carbon nanotube assembled wire obtained in sample 2-2.

<Measuring Carbon Nanotube Assembled Wire>
(Shape)

The carbon nanotube assembled wires of samples 2-1 and 2-2 were measured in average length and average diameter. How the average length and the average diameter were measured is the same as has been described in Embodiment 5, and accordingly, it will not be described repeatedly.

The CNT assembled wire of sample 2-1 was in the form of a linear yarn composed of a plurality of carbon nanotubes oriented and assembled together in their longitudinal direction, and had an average length of 12 cm and an average diameter of 60 μm.

The CNT assembled wire of sample 2-2 was in the form of a linear yarn composed of a plurality of carbon nanotubes oriented and assembled together in their longitudinal direction, and had an average length of 20 cm and an average diameter of 60 μm.

When the carbon nanotube assembled wires of samples 2-1 and 2-2 were observed with a TEM, it has been confirmed that a plurality of carbon nanotubes each had one or opposite terminals with a catalyst particle adhering thereto.

(Catalyst Particle)

The carbon nanotube assembled wires of samples 2-1 and 2-2 were each subjected to EDX analysis to identify a composition of catalyst particles included in each CNT assembled wire.

It has been confirmed that the carbon nanotube assembled wires of samples 2-1 and 2-2 included catalyst particles of iron particles. In addition, through SEM observation and EDX analysis, it has been confirmed that the iron particles are dispersed in the CNT assembled wires longitudinally thereof.

Further, when sample 2-2 was further observed with a SEM, it has been confirmed that the iron particles were substantially spherical and had a substantially uniform particle diameter, as shown in FIG. 12.

The carbon nanotube assembled wires of samples 2-1 and 2-2 had their catalyst particles subjected to measurement of average particle diameter. How the catalyst particles' average particle diameters were measured is the same as has been described in Embodiment 5, and accordingly, it will not be described repeatedly.

Sample 2-1 had catalyst particles with an average particle diameter of 19 nm.

Figure 14:
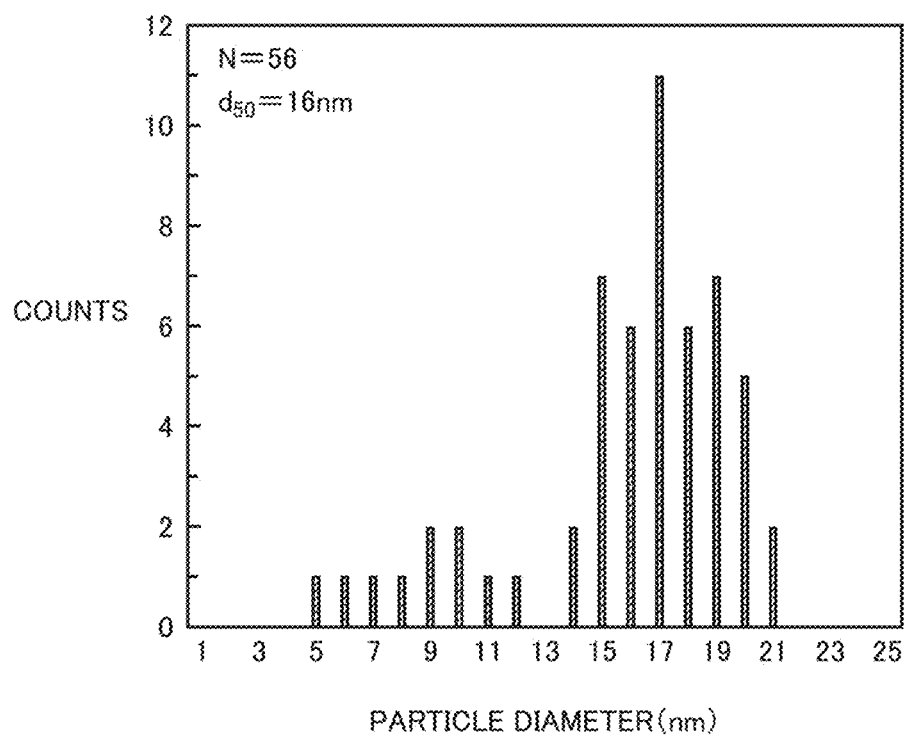
FIG. 14 is a graph showing a particle size distribution of catalyst particles in the carbon nanotube assembled wire obtained in example 2-2.

Sample 2-2 had catalyst particles with an average particle diameter of 16 nm. FIG. 14 shows a particle size distribution of the catalyst particles in the carbon nanotube assembled wire obtained in sample 2-2. From FIG. 14, it has been confirmed that the carbon nanotube assembled wire obtained in sample 2-2 had catalyst particles with a particle diameter of 5 nm or more and 21 nm or less.

While embodiments and examples of the present disclosure have been described as above, it is also planned from the beginning that the configurations of the above-described embodiments and examples are appropriately combined and variously modified.

[Study 3]

In a study 3, CNT assembled wire manufacturing apparatuses were used to investigate a relationship between an area in cross section of the second flow channel of the CNT assembling unit and a diameter and length of a CNT included in an obtained CNT assembled wire.

[Preparing Carbon Nanotube Assembled Wire Manufacturing Apparatus]

(Apparatuses 3-8)

Apparatuses 3 to 8 are basically similar in configuration to apparatus 2. Apparatuses 3 to 8 are different from apparatus 2 in area in cross section and length of each throughhole (or second flow channel) of a honeycomb. Apparatuses 3 to 8 each have a honeycomb structural body with each throughhole (or second flow channel) having an area in cross section and a length as shown in Table 1. For example, apparatus 3 has a honeycomb structural body with each throughhole (or second flow channel) having an area in cross section of 9.61 $cm^2$ and a length of 50 mm. Apparatuses 3-8 correspond to examples.

[Producing Carbon Nanotube Assembled Wires]

Carbon nanotube assembled wires for samples 3 to 8 were produced using apparatuses 3 to 8, respectively, as manufacturing apparatuses. For apparatuses 3 to 8, a mist source material liquid in which ferrocene was dispersed in ethanol was used. The concentration of the ferrocene in the mist source material liquid is 2% by weight.

In each of apparatuses 3 to 8, an atmosphere on an upstream side of the CNT assembling unit has a temperature of 1000° C. and an atmosphere on a downstream side of the CNT assembling unit has a temperature of 600° C.

With the mist source material liquid used to generate a mist by mist generator 60a, the electric furnace's internal temperature was raised to 1000° C. while argon gas having an argon gas concentration of 100% by volume was supplied from the gas supplying unit into the CNT growing unit at a flow rate of 1500 cc/min (flow velocity: 5.1 cm/sec) for 50 minutes. The mist had an average particle diameter of 25 μm. Thus, CNTs were grown in the CNT growing unit, and furthermore, the CNTs were drawn and assembled together in the CNT assembling unit, and CNT assembled wires for samples 3 to 8 were thus obtained.

[Measuring CNT Assembled Wires]

The CNT assembled wires of samples 3 to 8 had measured their degrees of orientation and their CNTs' diameters. How their degrees of orientation and their CNTs' diameters were measured is the same as has been described in Embodiment 5, and accordingly, it will not be described repeatedly. A result thereof is shown in Table 1.

TABLE 1

| samples | 2nd flow channel (through hole) | | CNT | |
| --- | --- | --- | --- | --- |
| | area in cross section (mm²) | length (mm) | degree of orientation | diameter (nm) |
| 3 | 9.61 | 50 | 0.90 | 2 |
| 4 | 4 | 50 | 0.92 | 1.5 |
| 5 | 1.96 | 50 | 0.92 | 1.5 |
| 6 | 1.96 | 100 | 0.94 | 1 |
| 7 | 1.21 | 50 | 0.94 | 1 |
| 8 | 0.81 | 50 | 0.94 | 1 |

[Evaluation]

From samples 3 to 8, it has been confirmed that the smaller the area in cross section of the through hole (or second flow channel) is, the smaller the diameter of the CNT tends to be. In addition, from samples 5 and 6, it has been confirmed that the longer the through hole is, the smaller the diameter of the CNT tends to be.

[Study 4]

In a study 4, what relationship the temperature of the atmosphere on the upstream side of the CNT assembling unit and that of the atmosphere on the downstream side of the CNT assembling unit have with a ratio of CNTs assembled together was investigated in a CNT assembled wire manufacturing process.

[Preparing Carbon Nanotube Assembled Wire Manufacturing Apparatus]

As a CNT assembled wire manufacturing apparatus, an apparatus having the same configuration as that of apparatus 3 for study 3 was prepared.

[Producing Carbon Nanotube Assembled Wires]

(Manufacturing Process 4-1)

In a manufacturing process 4-1, a CNT assembled wire was produced under the same conditions as those for apparatus 3 used in study 3.

(Manufacturing Process 4-2)

In a manufacturing process 4-2, a CNT assembled wire was produced in a method similar to that of manufacturing process 4-1, except that the atmosphere on the downstream side of the CNT assembling unit had a temperature of 500° C.

(Manufacturing Process 4-3) In a manufacturing process 4-3, a CNT assembled wire was produced in a method similar to that of manufacturing process 4-1, except that the atmosphere on the downstream side of the CNT assembling unit had a temperature of 300° C.

[Evaluation]

In manufacturing process 4-1, when the downstream side of the CNT assembling unit was observed with an SEM, it has been confirmed that single CNTs were also present together with a CNT assembled wire.

In manufacturing process 4-2, when the downstream side of the CNT assembling unit was observed with a TEM, it has been confirmed that single CNTs were also present together with a CNT assembled wire. The manufacturing process presented a lower ratio of single CNTs than manufacturing process 4-1.

In manufacturing process 4-3, when the downstream side of the CNT assembling unit was observed with a TEM, a CNT assembled wire was confirmed. No single CNT was observed.

From the above, it has been confirmed that when the downstream side of the CNT assembling unit is lower in temperature, CNT assembled wires are formed at a higher ratio and single CNTs are present at a lower ratio. It is inferred that this is because CNTs are assembled together more easily when the downstream side of the CNT assembling unit is lower in temperature.

[Study 5]

In a study 5, in a CNT assembled wire bundle manufacturing process, a relationship between whether the volatile liquid adhering and evaporating steps are performed and a CNT assembled wire bundle's density was investigated.

[Preparing Carbon Nanotube Assembled Wire Bundle Manufacturing Apparatus]

(Apparatus 5-1)

As an apparatus 5-1 was prepared an apparatus including: a CNT assembled wire manufacturing apparatus having the same configuration as that of apparatus 3 for study 3; and a bundling unit including a diaphragm and a winding apparatus downstream of the CNT assembled wire manufacturing apparatus.

(Apparatus 5-2)

As an apparatus 5-2, a CNT assembled wire bundle manufacturing apparatus having the configuration shown in FIG. 16 was prepared. Specifically, apparatus 5-2 is similar in configuration to apparatus 5-1, and furthermore, downstream of the diaphragm, includes a liquid adhering apparatus followed by a winding apparatus. Ethanol is sealed in the liquid adhering apparatus.

(Apparatus 5-3)

As an apparatus 5-3, a CNT assembled wire bundle manufacturing apparatus having a configuration shown in FIG. 17 was prepared. Specifically, apparatus 5-3 is similar in configuration to apparatus 5-1, and further comprises a liquid adhering apparatus disposed between a CNT assembled wire manufacturing apparatus and a diaphragm, and a winding apparatus disposed downstream of the diaphragm. Ethanol is sealed in the liquid adhering apparatus as a volatile liquid.

(Apparatus 5-4)

As an apparatus 5-4, an apparatus having a configuration similar to that of apparatus 3 for study 3 was prepared.

[Producing Carbon Nanotube Assembled Wire Bundles]

(Manufacturing Process 5-1)

In a manufacturing process 5-1, CNT assembled wires were manufactured under conditions similar to those in manufacturing process 4-1, and subsequently, the CNT assembled wires were bundled through a diaphragm to obtain a CNT assembled wire bundle for sample 5-1. The bundling step was performed while applying tension to the CNT assembled wires by winding the CNT assembled wire bundle with the winding apparatus.

(Manufacturing Process 5-2)

In a manufacturing process 5-2, CNT assembled wires were manufactured under conditions similar to those in manufacturing process 4-1 and bundled together through a diaphragm, and subsequently, a volatile liquid in the form of vapor was adhered to the CNT assembled wires and thereafter the volatile liquid was naturally dried and thus evaporated to obtain a CNT assembled wire bundle for sample 5-2. The bundling step was performed while applying tension to the CNT assembled wires by winding the CNT assembled wire bundle with the winding apparatus.

(Manufacturing Process 5-3)

In a manufacturing process 5-3, CNT assembled wires were manufactured under conditions similar to those in manufacturing process 4-1 and a volatile liquid in the form of vapor was adhered to the CNT assembled wires, and subsequently, the CNT assembled wires were bundled together through a diaphragm and the volatile liquid was naturally dried and thus evaporated to obtain a CNT assembled wire bundle for sample 5-3. The bundling step was performed while applying tension to the CNT assembled wires by winding the CNT assembled wire bundle with the winding apparatus.

(Manufacturing Process 5-4)

In a manufacturing process 5-4, a CNT assembled wire bundle was manufactured under conditions similar to those for manufacturing process 4-1.

[Evaluation]

<Measuring Carbon Nanotube Assembled Wire Bundles>

(Degree of Orientation)

The carbon nanotube assembled wire bundles of samples 5-1 to 5-4 had their degrees of orientation measured. The method used herein to calculate a degree of orientation of CNT (hereinafter also referred to as "CNT's degree of orientation") in a CNT assembled wire is the same as the method described in Embodiment 5, and accordingly, it will not be described repeatedly. The method used herein to calculate a degree of orientation of CNT assembled wires (hereinafter also referred to as "CNT assembled wire's degree of orientation") in a CNT assembled wire bundle is the same as the method described in Embodiment 8, and accordingly, it will not be described repeatedly. A result thereof is shown in table 2, the "CNT's degree of orientation" and "CNT assembled wire's degree of orientation" columns.

(Density)

The CNT assembled wire bundles of samples 5-1 to 5-4 were measured in density. Density was calculated based on the CNT assembled wire bundle's volume and weight, and represented in % as compared with 100% of CNT. A result thereof is shown in table 2, the "density" column.

(Breaking Strength)

The carbon nanotube assembled wire bundles of samples 5-1 to 5-4 were measured for breaking strength. Breaking strength was measured as follows:

A CNT assembled wire having a length of about 3 cm was prepared, and had its opposite ends fixed to a tensile jig plate with an adhesive. A load cell (measurement instrument: ZTS-5N manufactured by IMADA Co., Ltd.) was used to measure tensile stress acting until a portion of 1 cm of the CNT assembled wire which was not fixed with the adhesive broke. A result thereof is shown in table 2, the "Breaking Strength" column.

TABLE 2

| | bundling step | | CNT assembled wire bundle | | | |
|---|---|---|---|---|---|---|
| samples | tension | adhering step | CNT's degree of orientation | CNT assembled wire's degree of orientation | density | breaking strength |
| 5-1 | applied | not applied | 0.90 | 0.85 | 45% | 1.8 GPa |
| 5-2 | applied | applied | 0.94 | 0.90 | 70% | 2.8 GPa |
| 5-3 | applied | applied | 0.94 | 0.93 | 80% | 3.4 GPa |
| 5-4 | not applied | not applied | 0.85 | 0.75 | 40% | 1.4 GPa |

DISCUSSION

When samples 5-1 and 5-4 were compared, it has been confirmed that when the bundling step is performed with CNT assembled wires tensioned, a CNT assembled wire bundle increased in density and hence strength is obtained.

When samples 5-1 to 5-3 were compared, it has been confirmed that when the bundling step includes the volatile liquid adhering and evaporating steps, a CNT assembled wire bundle increased in density and hence strength is obtained.

While embodiments and examples of the present disclosure have been described as above, it is also planned from the beginning that the configurations of the above-described embodiments and examples are appropriately combined and variously modified.

The embodiments and examples disclosed herein are illustrative in any respects and should not be construed as being restrictive. The scope of the present invention is defined by the scope of the claims, rather than the embodiments and the examples described above, and is intended to include any modifications within the scope and meaning equivalent to the scope of the claims.

REFERENCE SIGNS LIST 1, 1a, 1b, 1c, 1d carbon nanotube assembled wire, 2 carbon nanotube, 3 carbon nanotube assembled wire bundle, 20, 20a, 20b, 20c CNT assembled wire manufacturing apparatus, 21 CNT growing unit, 22 gas supplying unit, 23 catalyst supplying unit, 24, 24a carbon nanotube assembling unit, 25 heater, 26 catalyst holder, 27 catalyst, 28 electric furnace, 29 honeycomb structural body, 30 CNT drawing unit, 31 reactor tube, 32 magnetic line of force, 33 positive electrode, 34 negative electrode, 35 oriented region, 36 amorphous region, 37 mist generating unit, 38 mist source material liquid, 39 mist, 40 gas introduction port, 41a horn transducer, 41b transducer, 42 mesh, 43 water, 44 air inlet port, 45 connecting portion, 47 first container, 48 second container, 49 container, 50 CNT manufacturing apparatus, 51 baffle, 52 nozzle, 53 pipe, 55 electric wire, 60, 60a, 60b, 60c mist generator, 500, 501 carbon nanotube assembled wire bundle manufacturing apparatus, 550 bundling unit, 551 liquid adhering apparatus, 552 winding apparatus, 553 volatile liquid, 554 vapor, 555 diaphragm, T tube portion, C cone portion, P catalyst particle.

The invention claimed is:

1. A method for manufacturing a carbon nanotube comprising:
   a mist generating step of generating a mist including a catalyst particle and a liquid carbon source;
   a growing step of growing a carbon nanotube from the catalyst particle by heating the mist; and
   a drawing step of drawing the carbon nanotube that is obtained in the growing step by applying a tensile force to the carbon nanotube, wherein the tensile force is applied to the carbon nanotube in a direction toward a downstream side by varying a carrier gas in flow velocity by making an average flow velocity of the carrier gas on the downstream side larger than an average flow velocity of the carrier gas on an upstream side.

2. The method for manufacturing a carbon nanotube according to claim 1, wherein the mist has an average particle diameter of 0.1 μm or more and 50 μm or less.

3. The method for manufacturing a carbon nanotube according to claim 1, wherein the catalyst particle includes iron.

4. The method for manufacturing a carbon nanotube according to claim 1, wherein the mist generating step includes:

a preparation step of preparing a mist source material liquid containing the catalyst particle and the liquid carbon source; and an atomization step of atomizing the mist source material liquid by applying ultrasonic vibration to the mist source material liquid.

5. The method for manufacturing a carbon nanotube according to claim 1, wherein the mist generating step includes:

a preparation step of preparing a mist source material liquid containing the catalyst particle and the liquid carbon source; and an atomization step of atomizing the mist source material liquid by passing the mist source material liquid through a mesh while applying ultrasonic vibration to the mist source material liquid.

6. The method for manufacturing a carbon nanotube according to claim 5, wherein the mesh has an opening having a diameter of 1 µm or more and 50 µm or less.

7. A method for manufacturing a carbon nanotube assembled wire comprises:

a mist generating step of generating a mist including a plurality of catalyst particles and a liquid carbon source;

a growing step of growing one or more carbon nanotubes from each of the plurality of catalyst particles by heating the mist; and an assembling step of obtaining a carbon nanotube assembled wire by orienting and assembling the carbon nanotubes in their longitudinal direction, wherein:

in the growing step, the carbon nanotubes pass through a first flow channel, in the assembling step, the carbon nanotubes pass through one or more second flow channels located downstream of the first flow channel, and the one or more second flow channels each have an area in cross section smaller than an area in cross section of the first flow channel.

8. The method for manufacturing a carbon nanotube assembled wire according to claim 7, further comprising a drawing step of drawing the carbon nanotubes that are obtained in the growing step by applying a tensile force to the carbon nanotubes.

9. The method for manufacturing a carbon nanotube assembled wire according to claim 7, wherein an atmosphere downstream of the one or more second flow channels is lower in temperature than an atmosphere upstream of the one or more second flow channels.

10. The method for manufacturing a carbon nanotube assembled wire according to claim 7, wherein the atmosphere upstream of the one or more second flow channels has a temperature of 800° C. or more, and the atmosphere downstream of the one or more second flow channels has a temperature of 600° C. or less.

11. The method for manufacturing a carbon nanotube assembled wire according to claim 9, wherein an atmosphere inside the one or more second flow channels has temperature lower at a downstream side thereof than an upstream side thereof, and an atmosphere inside the one or more second flow channels at a downstream end thereof has a temperature of 600° C. or less.

12. The method for manufacturing a carbon nanotube assembled wire according to claim 7, wherein in the one or more second flow channels at a downstream side thereof there is a first region having an atmosphere with a temperature of 600° C. or less, and the first region has a length of 1 cm or more in a longitudinal direction of the one or more second flow channels.

13. The method for manufacturing a carbon nanotube assembled wire according to claim 7, wherein the one or more second flow channels each have an area in cross section of 0.01 mm$^2$ or more and 4 mm$^2$ or less.

14. The method for manufacturing a carbon nanotube assembled wire according to claim 7, wherein a ratio S1/S2 is 100 or more and 1000000 or less, where S1 is an area in cross section of the first flow channel and S2 is an area in cross section of each of the second flow channels.

15. The method for manufacturing a carbon nanotube assembled wire according to claim 7, wherein in the assembling step, the carbon nanotubes are reduced in diameter, and a ratio S1/S2 is 100 or more and 1000000 or less, where S1 is an area in cross section of the first flow channel and S2 is an area in cross section of each of the second flow channels.

16. The method for manufacturing a carbon nanotube assembled wire according to claim 7, wherein the one or more second flow channels each have a length of 10 mm or more and 200 mm or less.

17. A method for manufacturing a carbon nanotube assembled wire bundle comprising:

a mist generating step of generating a mist including a plurality of catalyst particles and a liquid carbon source;

a growing step of growing one or more carbon nanotubes from each of the plurality of catalyst particles by heating the mist;

an assembling step of obtaining a plurality of carbon nanotube assembled wires by orienting and assembling the carbon nanotubes in their longitudinal direction; and an obtaining step of obtaining a carbon nanotube assembled wire bundle by orienting and bundling the plurality of carbon nanotube assembled wires in their longitudinal direction, wherein:

in the growing step, the carbon nanotubes pass through a first flow channel, in the assembling step, the carbon nanotubes pass through one or more second flow channels located downstream of the first flow channel, and the one or more second flow channels each have an area in cross section smaller than an area in cross section of the first flow channel.

18. The method for manufacturing a carbon nanotube assembled wire bundle according to claim 17, wherein the bundling step is performed while tension is applied to the plurality of carbon nanotube assembled wires.

19. The method for manufacturing a carbon nanotube assembled wire bundle according to claim 17, wherein the obtaining step further includes: an adhering step of adhering a volatile liquid to the plurality of carbon nanotube assembled wires; and an evaporating step of evaporating the volatile liquid adhered to the plurality of carbon nanotube assembled wires.

20. The method for manufacturing a carbon nanotube assembled wire bundle according to claim 19, wherein the adhering step is performed before orienting and bundling the plurality of carbon nanotube assembled wires in their longitudinal direction.

21. The method for manufacturing a carbon nanotube assembled wire bundle according to claim 19, wherein the adhering step is performed after orienting and bundling the plurality of carbon nanotube assembled wires in their longitudinal direction.

22. A carbon nanotube manufacturing apparatus comprising:
- a mist generating unit that generates a mist including a catalyst particle and a liquid carbon source;
- a tubular carbon nanotube growing unit that is connected to the mist generating unit and grows a carbon nanotube from the catalyst particle by heating the mist; and
- a drawing unit that draws a carbon nanotube that is connected to the tubular carbon nanotube growing unit on a side opposite to a side where the mist generating unit is disposed;
- wherein a hollow portion in the drawing unit passing carbon-containing gas has a cross section smaller in area than a hollow portion in the tubular carbon nanotube growing unit passing the carbon-containing gas.

23. A carbon nanotube assembled wire manufacturing apparatus comprising:
- a mist generating unit that generates a mist including a plurality of catalyst particles and a liquid carbon source;
- a tubular carbon nanotube growing unit that is connected to the mist generating unit and grows one or more carbon nanotubes from each of the plurality of catalyst particles by heating the mist; and
- a carbon nanotube assembling unit that is located on a side of one end of the carbon nanotube growing unit, and obtains a carbon nanotube assembled wire by orienting and assembling the carbon nanotubes that are obtained in the carbon nanotube growing unit in their longitudinal direction, wherein:
- the tubular carbon nanotube growing unit internally has a first flow channel,
- the carbon nanotube assembling unit internally has one or more second flow channels, and
- the one or more second flow channels each have an area in cross-section smaller than an area in cross-section of the first flow channel.

* * * * *